(12) United States Patent
Kasperchik et al.

(10) Patent No.: US 11,872,747 B2
(45) Date of Patent: Jan. 16, 2024

(54) THREE-DIMENSIONAL (3D) PRINTING

(71) Applicant: HEWLETT-PACKARD DEVELOPMENT COMPANY, L.P., Houston, TX (US)

(72) Inventors: Vladek Kasperchik, Corvallis, OR (US); Krzysztof Nauka, Palo Alto, CA (US); David Michael Ingle, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 924 days.

(21) Appl. No.: 16/079,359

(22) PCT Filed: Jul. 6, 2017

(86) PCT No.: PCT/US2017/040937
§ 371 (c)(1),
(2) Date: Aug. 23, 2018

(87) PCT Pub. No.: WO2019/009906
PCT Pub. Date: Jan. 10, 2019

(65) Prior Publication Data
US 2021/0187612 A1    Jun. 24, 2021

(51) Int. Cl.
*B33Y 10/00*    (2015.01)
*B22F 10/14*    (2021.01)
(Continued)

(52) U.S. Cl.
CPC ............ *B29C 64/165* (2017.08); *B22F 10/14* (2021.01); *B22F 12/41* (2021.01); *B33Y 10/00* (2014.12);
(Continued)

(58) Field of Classification Search
CPC ..... B29C 64/112; B29C 64/165; B33Y 10/00; B33Y 40/00; B33Y 40/10; B33Y 70/00;
(Continued)

(56) References Cited

U.S. PATENT DOCUMENTS 5,940,674 A * 8/1999 Sachs ................. B33Y 10/00
                                                                 419/36
6,508,980 B1   1/2003 Sachs et al.
(Continued)

FOREIGN PATENT DOCUMENTS

CN        1486353 A      3/2004
CN      104619793        5/2015
(Continued)

OTHER PUBLICATIONS

Editors Brian Ellis and Ray Smith, Polymers: A Property Database, Second ed., CRC Press, 2009, pp. 726-735 (Year: 2009).*
(Continued)

*Primary Examiner* — Vanessa T. Luk
(74) *Attorney, Agent, or Firm* — HP Inc. Patent Department

(57) ABSTRACT

Described herein are methods and systems for printing a three-dimensional object. In an example, a method for printing a three-dimensional object can comprise: (i) a metallic build material being applied; (ii) a binder fluid being applied on at least a portion of the metallic build material; (iii) the selectively applied binder fluid can be flash fused to bind the metallic build material and the selectively applied binder fluid by application of an energy flux having an energy density of from about 0.5 J/cm$^2$ to about 20 J/cm$^2$ for less than about 1 second. In the example, (i), (ii), and (iii) can be repeated at least one time to form the three-dimensional object. The binder fluid can comprise a liquid vehicle and polymer particles dispersed in the liquid vehicle.

14 Claims, 12 Drawing Sheets

(51) Int. Cl.

| | |
|---|---|
| *B22F 10/36* | (2021.01) |
| *B29C 64/165* | (2017.01) |
| *B33Y 30/00* | (2015.01) |
| *B33Y 70/10* | (2020.01) |
| *B22F 12/41* | (2021.01) |
| *B22F 10/68* | (2021.01) |
| *B22F 12/42* | (2021.01) |
| *B22F 12/52* | (2021.01) |
| *B22F 12/60* | (2021.01) |
| *B22F 10/368* | (2021.01) |
| *B22F 10/64* | (2021.01) |

(52) U.S. Cl.
CPC ............... *B33Y 30/00* (2014.12); *B33Y 70/10* (2020.01); *B22F 10/36* (2021.01); *B22F 10/368* (2021.01); *B22F 10/64* (2021.01); *B22F 10/68* (2021.01); *B22F 12/42* (2021.01); *B22F 12/52* (2021.01); *B22F 12/60* (2021.01); *B22F 2201/01* (2013.01); *B22F 2201/10* (2013.01)

(58) Field of Classification Search
CPC ...... B33Y 70/10; B22F 1/0059; B22F 1/0074; B22F 2001/0066
See application file for complete search history.

(56) References Cited

U.S. PATENT DOCUMENTS

| | | | | |
|---|---|---|---|---|
| 7,220,380 | B2 | 5/2007 | Farr et al. | |
| 9,505,058 | B2 | 11/2016 | Wu et al. | |
| 2001/0050031 | A1* | 12/2001 | Bredt | B29C 67/24 106/162.9 |
| 2002/0149659 | A1* | 10/2002 | Wu | C09D 11/101 347/102 |
| 2005/0079086 | A1* | 4/2005 | Farr | B33Y 40/00 419/36 |
| 2012/0163553 | A1 | 6/2012 | Deych et al. | |
| 2014/0043398 | A1* | 2/2014 | Butler | B41J 2/14427 524/502 |
| 2014/0349025 | A1* | 11/2014 | Hui | H01B 1/22 427/492 |
| 2015/0328719 | A1* | 11/2015 | Jarvis | B22F 10/20 219/76.12 |
| 2016/0167132 | A1 | 6/2016 | Panat | |
| 2016/0172741 | A1 | 11/2016 | Panat et al. | |
| 2016/0332236 | A1 | 11/2016 | Stoyanov | |
| 2017/0080497 | A1* | 3/2017 | Tuffile | C22C 38/04 |
| 2018/0236731 | A1* | 8/2018 | Natarajan | B33Y 40/00 |
| 2019/0009465 | A1* | 1/2019 | Monroe | B29C 64/165 |

FOREIGN PATENT DOCUMENTS

| | | | |
|---|---|---|---|
| CN | 104837920 | 8/2015 | |
| CN | 105122136 | 12/2015 | |
| CN | 105358261 A | 2/2016 | |
| CN | 105916664 | 8/2016 | |
| CN | 106180706 | 12/2016 | |
| CN | 106794623 | 5/2017 | |
| DE | 102012009464 A1 | 11/2013 | |
| EP | 3098001 A1 | 11/2016 | |
| JP | 06218712 | 8/1994 | |
| JP | 2004-330743 A | 11/2004 | |
| JP | 2016-216801 | 12/2016 | |
| RU | 2497978 C2 | 11/2013 | |
| WO | 2007/097747 A1 | 8/2007 | |
| WO | 2014077848 A1 | 5/2014 | |
| WO | WO-2015167520 | 11/2015 | |
| WO | WO-2016010590 A1 * | 1/2016 | ............ B29C 48/02 |
| WO | WO-2016048375 A1 * | 3/2016 | ............ B33Y 70/00 |
| WO | 2016053305 A1 | 4/2016 | |
| WO | WO-2016079193 A1 * | 5/2016 | ............ B22F 10/00 |
| WO | 2016083234 A1 | 6/2016 | |
| WO | 2017/079282 A1 | 5/2017 | |

OTHER PUBLICATIONS

Safety Data Sheet: DPM Acetate, CISCO Carolina International Sales Co., Inc., Jun. 26, 2015 (Year: 2015).*
Technical Data Sheet: EB Acetate, CISCO Carolina International Sales Co., Inc., Jun. 23, 2015 (Year: 2015).*
Sipila et al., "Parametric Optimization of Inkjet Printing and Optical Sintering of Nanoparticle Inks", Retrieved from Internet—http://tentzeris.ece.gatech.edu/EUCAP15_Sipila.pdf, Apr. 2015, 4 Pages.
Yoo et al., "Structural Ceramic Components by 3D Printing", Retrieved from Internet—https://sffsymposium.engr.utexas.edu/Manuscripts/1993/1993-04-Yoo.pdf, 1993, 11 Pages.
S. Atre et al., Process Parameter Optimization for Binder Jetting using 420 Stainless Steel, World PM2016-AM—New Technologies and Modeling.
S. K. Sarkar et al, Flash light sintering of silver ink for inkjet printed organic thin film transistor on flexible substrate, Third International Conference on Devices, Circuits and Systems (ICDCS'16) (publication year: 2016).

* cited by examiner

THREE-DIMENSIONAL (3D) PRINTING

BACKGROUND

Three-dimensional (3D) printing may be an additive printing process used to make three-dimensional solid parts from a digital model. 3D printing can be often used in rapid product prototyping, mold generation, mold master generation, and short run manufacturing. Some 3D printing techniques are considered additive processes because they involve the application of successive layers of material. This is unlike customary machining processes, which often rely upon the removal of material to create the final part. 3D printing can often use curing or fusing of the building material, which for some materials may be accomplished using heat-assisted extrusion, melting, or sintering.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
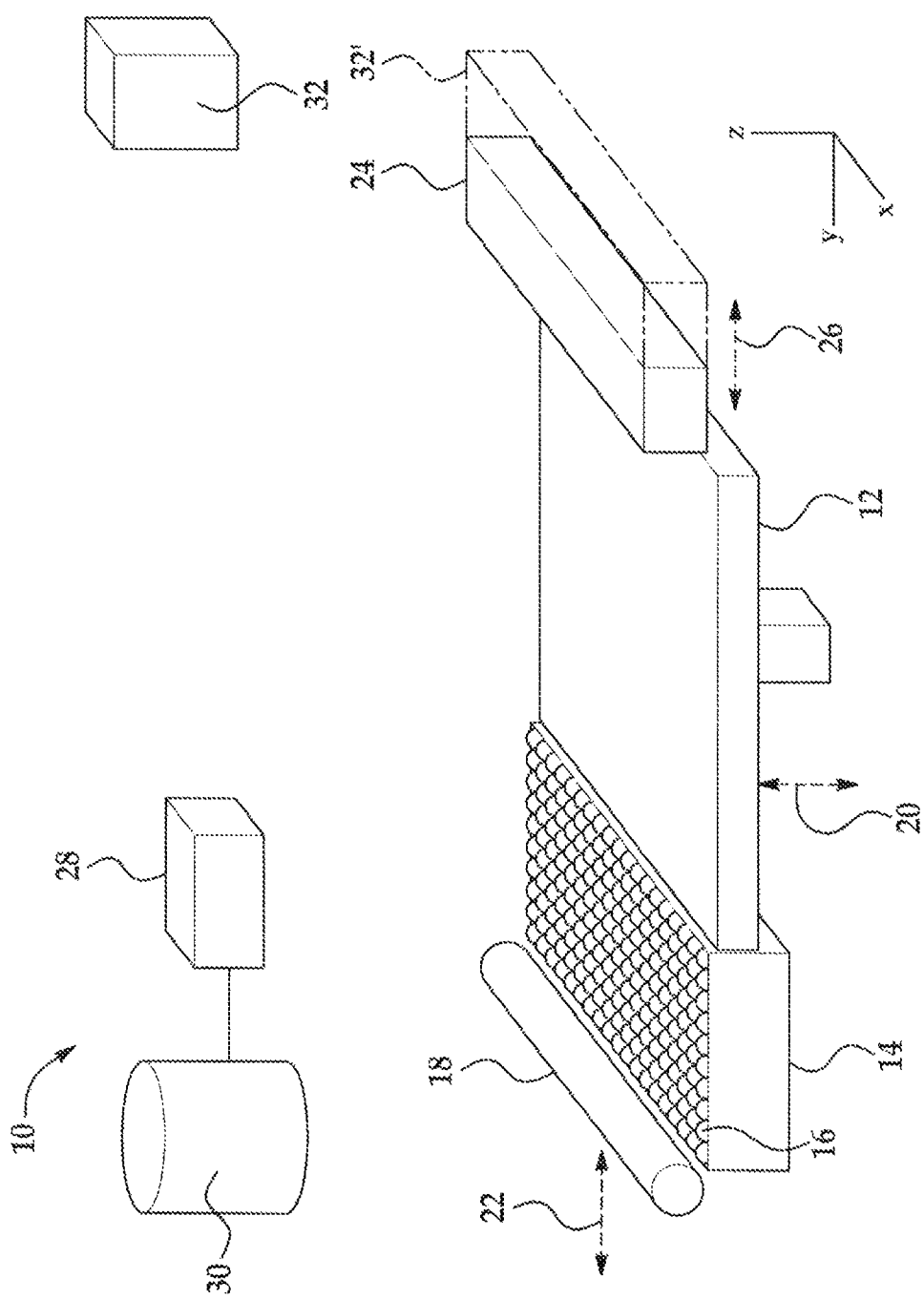
FIG. 1 is a simplified isometric view of an example 3D printing system disclosed herein.

In some examples of three-dimensional (3D) printing, a binder fluid (also known as a liquid functional agent/material) is selectively applied to a layer of build material, and then another layer of the build material is applied thereon. The binder fluid may be applied to this other layer of build material, and these processes may be repeated to form a three-dimensional object. The binder fluid may include a binder that holds the build material of the three-dimensional object together. The three-dimensional object may be exposed to photonic energy and/or heat during layer-by-layer building or after building to sinter the build material in the three-dimensional object to form the sintered 3D part.

As used herein, the terms "3D printed part," "3D part," "part," "3D printed object," "3D object," or "object" may be a completed 3D printed part or object or a layer of a 3D printed part or object.

As used herein, "(s)" at the end of some terms indicates that those terms/phrases may be singular in some examples or plural in some examples. It is to be understood that the terms without "(s)" may be also be used singularly or plurally in many examples.

When producing three-dimensional objects using widely accepted ways of heating the entire powder bed to melt the polymer particles in the patterned three-dimensional object, heat is generally applied for more than a few seconds. This can not only increase the amount of energy used to produce the three-dimensional object but can also cause thermal decomposition of polymer particles in the binder at least due to the length of time the patterned object is heated to achieve melting of the polymer particles.

There is, therefore, a demand for rapid melting of the polymer particles in the binder by application of energy to promote binding without degradation of the polymer.

As used herein, the term "patterned three-dimensional object" refers to an intermediate part that has a shape representative of the final 3D printed part and that includes metallic build material patterned with the binder fluid. In the patterned three-dimensional object, the metallic build material particles may or may not be weakly bound together by at least one component of the binder fluid and/or by attractive force(s) between the metallic build material particles and the binder fluid. In some instances, the mechanical strength of the patterned three-dimensional object is such that it cannot be handled or extracted from a build material platform. Moreover, it is to be understood that any metallic build material that is not patterned with the binder fluid is not considered to be part of the patterned three-dimensional object, even if it is adjacent to or surrounds the patterned three-dimensional object.

As used herein, the term "three-dimensional object" refers to the patterned three-dimensional object formed from flash fusing the selectively applied binder fluid which binds the metallic build material and the selectively applied binder fluid by applying an energy flux having an energy density of from about 0.5 J/cm$^2$ to about 20 J/cm$^2$ for less than about 1 second.

As used herein, the term "sintered three-dimensional object," which refers to a patterned three-dimensional object that has been exposed to a flash fusing process that initiates melting of the polymer particles in the binder fluid and that may also contribute to the evaporation of the liquid components of the binder fluid so that the polymer particles form a polymer glue that coats the metallic build material particles and creates or strengthens the bond between the metallic build material particles. In other words, the "sintered three dimensional object" is an intermediate part with a shape representative of the final 3D printed part and that includes metallic build material bound together by at least substantially melted polymer particles of the binder fluid (with which the metallic build material was patterned). Compared to the patterned three-dimensional object, the mechanical strength of the sintered three-dimensional object is greater.

As used herein, the term "sintered three-dimensional object" or refers to the "three-dimensional object" which has been heated to a sintering temperature.

As used herein, the terms "3D printed part," "3D part," or "metallic part" refer to a completed, sintered three-dimensional object.

In some examples, a method for printing a three-dimensional object can comprise:

(i) applying a metallic build material;

(ii) selectively applying a binder fluid on at least a portion of the metallic build material, wherein the binder fluid comprises a liquid vehicle and polymer particles dispersed in the liquid vehicle;

(iii) flash fusing the selectively applied binder fluid to bind the metallic build material and the selectively applied binder fluid by applying an energy flux having an energy density of from about 0.5 J/cm$^2$ to about 20 J/cm$^2$ for less than about 1 second; and (iv) repeating (i), (ii), and (iii) at least one time to form the three-dimensional object.

In some examples, at least partial evaporation of the liquids in the binder fluid occurs as a result of flash fusing.

In some examples, the method for printing the three-dimensional object can further comprise (ii-a) drying the selectively applied binder fluid by removing substantially most liquids from the binder fluid.

In some examples, the method for printing the three-dimensional object can further comprise (v) heating the three-dimensional object to a sintering temperature.

In some examples, the polymer particles can have a glass transition temperature of from about 25° C. to about 125° C.; and the polymer particles can have a thermal decomposition temperature of from about 250° C. to about 600° C.

In some examples, the flash fusing temperature can be from about 125° C. to about 400° C., or in some examples from about 125° C. to about 450° C.

In some examples, the flash fusing can occur using a photonic energy emitter which applies non-coherent photonic energy as at least one pulse to the metallic build material and the selectively applied binder fluid.

In some examples, the flash fusing can irradiate the metallic build material and the binder fluid.

In some examples, the flash fusing can occur using a gas discharge photonic energy emitter and the gas employed in the gas discharge photonic energy emitter can be selected from the group consisting of xenon, krypton, argon, helium, neon, and combinations thereof.

In some examples, the polymer particles can be present in the binder fluid in an amount ranging from about 2 wt % to about 30 wt % based on the total weight of the binder fluid.

In some examples, a printing system for printing three-dimensional objects is described. The printing system can comprise: a supply of metallic build material; a build material distributor; a supply of a binder fluid, the binder fluid including a liquid vehicle and polymer particles dispersed in the liquid vehicle; an inkjet applicator for selectively dispensing the binder fluid; and a photonic energy emitter for flash fusing the selectively applied binder fluid to bind the metallic build material and the selectively applied binder fluid by applying an energy flux having an energy density of from about 0.5 J/cm$^2$ to about 20 J/cm$^2$ for less than about 1 second.

In some examples, the photonic energy emitter can apply an energy flux having an energy density of about 0.5 J/cm$^2$ to about 25 J/cm$^2$, or less than about 20 J/cm$^2$, or less than about 10 J/cm$^2$, or less than about 5 J/cm$^2$, or less than about 2 J/cm$^2$, or less than about 1 J/cm$^2$. This energy density can be applied layer-by-layer, or every two layers, or every three layers, or so forth, or once the patterned three-dimensional object has been fully patterned.

In some examples, the photonic energy emitter can apply an energy flux for less than about 1 second, or less than about 0.5 seconds, or less than about 0.1 seconds, or less than about 0.01 seconds. This time period can be applicable for each layer-by-layer, or for every two layers, or for every three layers, or so forth, or once the patterned three-dimensional object has been fully patterned.

In some examples, the printing system can further comprise: a controller, and a non-transitory computer readable medium having stored thereon computer executable instructions to cause the controller to print a three-dimensional object by: utilizing the build material distributor and the inkjet applicator to iteratively form at least one layer of metallic build material having selective application of the binder fluid, and utilizing the photonic energy emitter to flash fuse the selectively applied binder fluid binding the metallic build material and the selectively applied binder fluid by applying an energy flux having an energy density of from about 0.5 J/cm$^2$ to about 20 J/cm$^2$ for less than about 1 second.

In some examples, the non-transitory computer readable medium having stored thereon the computer executable instructions to cause the controller to print the three-dimensional object by further-utilizing at least one heat source to heat the three-dimensional object to a sintering temperature.

In some examples, the heating of the three-dimensional object to the sintering temperature can be performed for a sintering time period ranging from about 10 minutes to about 48 hours, or less than about 36 hours, or less than about 24 hours, or less than about 12 hours, or less than about 10 hours, or less than about 8 hours, or less than about 6 hours, or less than about 4 hours, or less than about 2 hours, or less than about 1 hour.

In some examples, the heating of the three-dimensional object to the sintering temperature can occur in an environment containing an inert gas, a low reactivity gas, a reducing gas, a vacuum, a stage-wise exposure to at least one of the foregoing, or a combination thereof.

In some examples, the polymer particles can be latex polymer particles produced by free radical polymerization of monomers selected from (but not limited to) the group consisting of styrene, p-methyl styrene, o-methyl styrene, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, combinations thereof, derivatives thereof, and mixtures thereof.

In some examples disclosed herein, the binder fluid can include polymer particles, which are dispersed throughout a liquid vehicle of the binder fluid. When applied to a layer of metallic build material, the liquid vehicle is capable of wetting the build material and the polymer particles are capable of penetrating into the microscopic pores of the layer (i.e., the spaces between the metallic build material particles). As such, the polymer particles can move into vacant spaces between the metallic build material particles. The polymer particles in the binder fluid can be activated, cured, and/or melted by flash fusing the polymer particles in the binder fluid. During flash fusing the selectively applied binder fluid binds the metallic build material by application of an energy flux having an energy density of from about 0.5 J/cm$^2$ to about 20 J/cm$^2$ for less than about 1 second. When activated, cured, or melted, the polymer particles in the binder fluid form an at least substantially continuous network gluing the metallic build material particles into the three-dimensional object shape. The three-dimensional object has enough mechanical strength such that it is able to withstand extraction from the build material platform without being deleteriously affected (e.g., the shape is not lost).

In some examples, once extracted, the three-dimensional object can be de-bound by heating the three-dimensional object to the thermal decomposition temperature of the polymer particles to thermally decompose the polymer particles. When at least some of the polymer particles are thermally decomposed, an at least substantially polymer-free part can be formed. Then, the at least substantially polymer-free part can be heated to a sintering temperature to sinter the metallic build material particles and form the metallic part.

In some examples, once extracted, the three-dimensional object can be heated to a sintering temperature to sinter the metallic build material particles and form the sintered three-dimensional object or the metallic part.

Referring to the figures in this application, it is to be understood that the components and scale shown can be rearranged to different sizes and positions in a manner to not affect the functioning and the targeted results.

Referring now to FIG. 1, an example of a 3D printing system 10 is depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

The three-dimensional (3D) printing system 10 generally includes a supply 14 of metallic build material 16; a build material distributor 18; a supply of a binder fluid 36, the binder fluid 36 including a liquid vehicle and polymer particles dispersed in the liquid vehicle; an inkjet applicator 24 for selectively dispensing the binder fluid 36 (FIG. 2C); at least one photonic energy emitter 32, 32'; a controller 28; and a non-transitory computer readable medium having stored thereon computer executable instructions to cause the controller 28 to: utilize the build material distributor 18 and the inkjet applicator 24 to iteratively form multiple layers 34 (FIG. 2B) of metallic build material 16 which are applied by the build material distributor 18 and have received the binder fluid 36, thereby creating a patterned three-dimensional object 42 (FIG. 2E), and utilize the at least one photonic energy emitter 32, 32' to flash fuse the polymer particles in the patterned three-dimensional object 42 creating a three-dimensional object 42', and heat the three-dimensional object 42' using a heat source 48 to a sintering temperature to form a metallic part 50.

As shown in FIG. 1, the printing system 10 includes a build area platform 12, the build material supply 14 containing metallic build material particles 16, and the build material distributor 18.

The build area platform 12 receives the metallic build material 16 from the build material supply 14. The build area platform 12 may be integrated with the printing system 10 or may be a component that is separately insertable into the printing system 10. For example, the build area platform 12 may be a module that is available separately from the printing system 10. The build area platform 12 that is shown is also one example, and could be replaced with another support member, such as a platen, a fabrication/print bed, a glass plate, or another build surface.

Figure 2A:
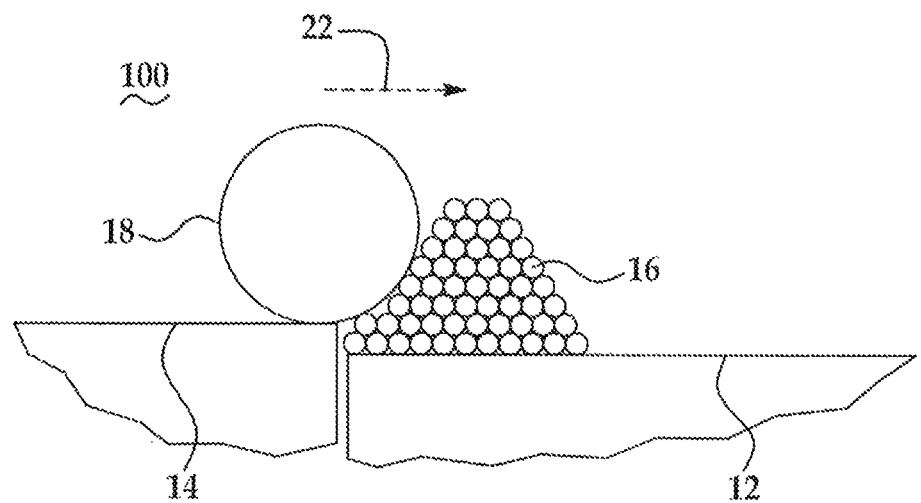
FIGS. 2A through 2F are schematic views depicting the formation of a patterned three-dimensional object, a three-dimensional object, an at least substantially polymer-free part, and a 3D metallic part using examples of a 3D printing method disclosed herein.
Figure 2B:
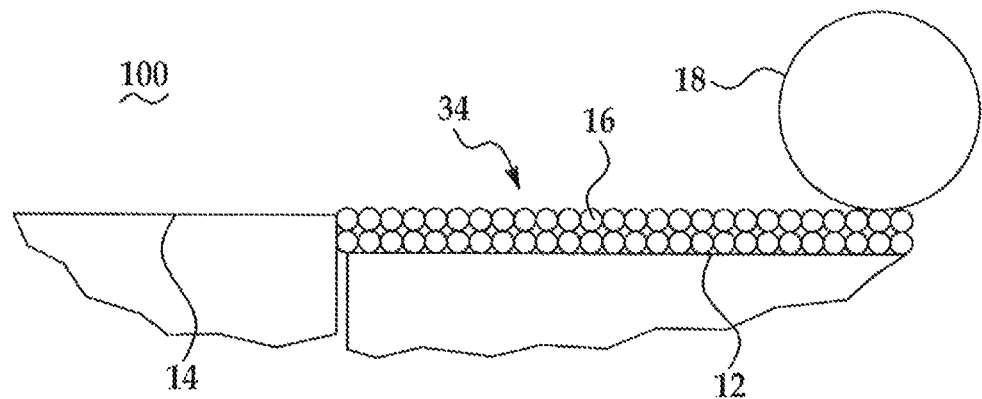
Figure 2C:
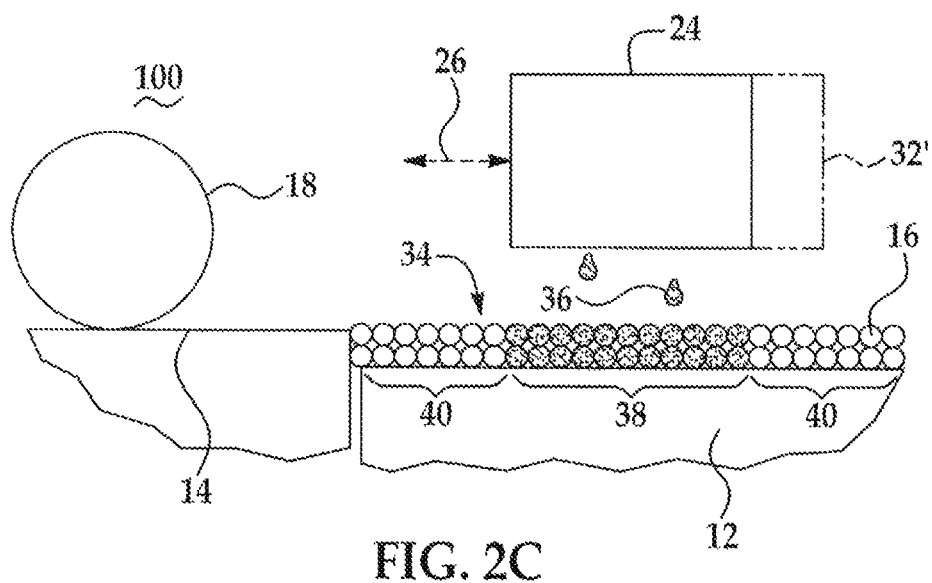
Figure 2D:
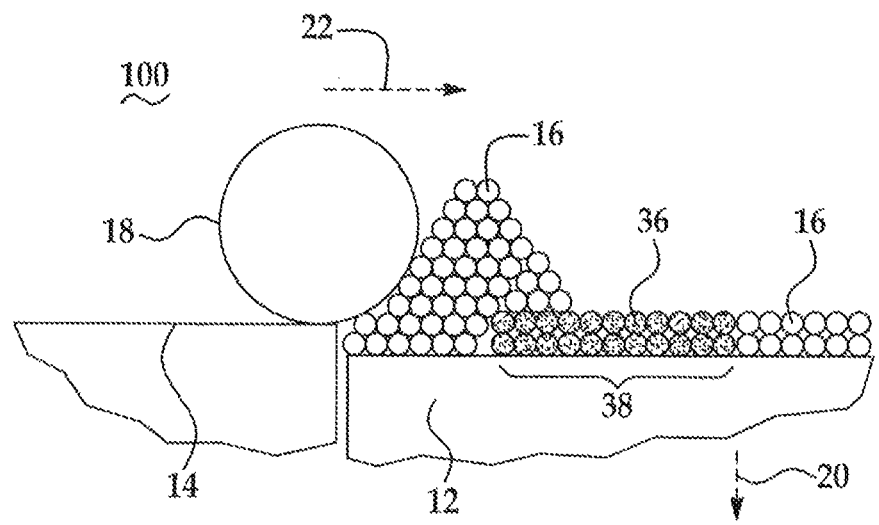

The build area platform 12 may be moved in a direction as denoted by the arrow 20, e.g., along the z-axis, so that metallic build material 16 may be delivered to the platform 12 or to a previously formed layer of metallic build material 16 (see FIG. 2D). In an example, when the metallic build material particles 16 are to be delivered, the build area platform 12 may be programmed to advance (e.g., downward) enough so that the build material distributor 18 can push the metallic build material particles 16 onto the platform 12 to form a layer 34 of the metallic build material 16 thereon (see, e.g., FIGS. 2A and 2B). The build area platform 12 may also be returned to its original position, for example, when a new part is to be built.

The build material supply 14 may be a container, bed, or other surface that is to position the metallic build material particles 16 between the build material distributor 18 and the build area platform 12. In some examples, the build material supply 14 may include a surface upon which the metallic build material particles 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to impart, e.g., move, the metallic build material particles 16 from a storage location to a position to be spread onto the build area platform 12 or onto a previously formed layer of metallic build material 16.

The build material distributor 18 may be moved in a direction as denoted by the arrow 22, e.g., along the y-axis, over the build material supply 14 and across the build area platform 12 to spread a layer of the metallic build material 16 over the build area platform 12. The build material distributor 18 may also be returned to a position adjacent to the build material supply 14 following the spreading of the metallic build material 16. The build material distributor 18 may be a blade (e.g., a doctor blade), a roller, a combination of a roller and a blade, and/or any other device capable of spreading the metallic build material particles 16 over the build area platform 12. For instance, the build material distributor 18 may be a counter-rotating roller.

The metallic build material 16 may be any particulate metallic material. In an example, the metallic build material 16 may be a powder. In another example, the metallic build material 16 may have the ability to sinter into a continuous body to form the metallic part 50 (see. e.g., FIG. 2F) when heated to the sintering temperature (e.g., a temperature ranging from about 850° C. to about 2500° C.). By "continuous body," it is meant that the metallic build material particles are merged together to form a single part with little or no porosity and with sufficient mechanical strength to meet conditions of a target final metallic part 50.

While an example sintering temperature range is suggested, it is to be understood that this temperature may vary, depending, in part, upon the composition and phase(s) of the metallic build material 16.

In an example, the metallic build material 16 is a single phase metallic material composed of one element. In this example, the sintering temperature may be below the melting point of the single element.

In another example, the metallic build material 16 can be composed of two or more elements, which may be in the form of a single phase metallic alloy or a multiple phase metallic alloy. In these other examples, melting generally occurs over a range of temperatures. For some single phase metallic alloys, melting begins just above the solidus temperature (where melting is initiated) and is not complete until the liquidus temperature (temperature at which all the solid has melted) is exceeded. For other single phase metallic alloys, melting begins just above the peritectic temperature. The peritectic temperature is defined by the point where a single phase solid transforms into a two phase solid plus liquid mixture, where the solid above the peritectic temperature is of a different phase than the solid below the peritectic temperature. When the metallic build material 16 is composed of two or more phases (e.g., a multiphase alloy made of two or more elements), melting generally begins when the eutectic or peritectic temperature is exceeded. The eutectic temperature is defined by the temperature at which a single phase liquid completely solidifies into a two phase solid. Generally, melting of the single phase metallic alloy or the multiple phase metallic alloy begins just above the solidus, eutectic, or peritectic temperature and is not complete until the liquidus temperature is exceeded. In some examples, sintering can occur below the solidus temperature, the peritectic temperature, or the eutectic temperature. In other examples, sintering occurs above the solidus temperature, the peritectic temperature, or the eutectic temperature. Sintering above the solidus temperature is referred to as super solidus sintering, and this technique may be useful when using larger build material particles and/or to achieve high density. In an example, the build material composition may be selected so that at least 40 vol % of the metallic build material is made up of phase(s) that have a melting point above a target sintering temperature. It is to be understood that the sintering temperature may be high enough to offer sufficient energy to allow atom mobility between adjacent particles. In some examples, the metallic build particle size can be sufficiently small such that the sintering temperature may be about 100° C.-150° C. below solidus. Without wishing to be bound by theory, the lower the metallic build particle size, the faster the sintering process can be and a lower temperature can be used during the sintering process.

Single elements or alloys may be used as the metallic build material 16. Some examples of the metallic build material 16 include steels, stainless steel, bronzes, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, and copper (Cu) and alloys thereof. Some specific examples include AlSi10Mg, 2xxx series aluminum, 4xxx series aluminum, CoCr MP1, CoCr SP2, MaragingSteel MS1, Hastelloy C, Hastelloy X, NickelAlloy HX, Inconel IN625, Inconel IN718, SS GP1, SS 17-4PH, SS 316L, Ti6Al4V, and Ti-6Al-4V ELI7. While several example alloys have been suggested, it is to be understood that other alloy build materials may be used, such as PbSn soldering alloys.

Any metallic build material 16 may be used that is in powder form at the outset of the 3D printing method(s) disclosed herein. As such, the melting point, solidus temperature, eutectic temperature, and/or peritectic temperature of the metallic build material 16 may be above the temperature of the environment in which the patterning portion of the 3D printing method is performed (e.g., above 40° C.). In some examples, the metallic build material 16 may have a melting point ranging from about 850° C. to about 3500° C. In other examples, the metallic build material 16 may be an alloy having a range of melting points. Alloys may include metals with melting points as low as about −39° C. (e.g., mercury), or about 30° C. (e.g., gallium), or about 157° C. (e.g., indium).

The metallic build material 16 may be made up of similarly sized particles or differently sized particles. In the examples shown herein (FIG. 1 and FIGS. 2A-2F), the metallic build material 16 includes similarly sized particles. The term size, as used herein with regard to the metallic build material 16, refers to the diameter of a substantially spherical particle (i.e., a spherical or near-spherical particle having a sphericity of >0.84), or the average diameter of a non-spherical particle (i.e., the average of multiple diameters across the particle). Substantially spherical particles of this particle size have good flowability and can be spread relatively easily. As an example, the average particle size of the particles of the metallic build material 16 may range from about 1 μm to about 200 μm. As another example, the average size of the particles of the metallic build material 16 ranges from about 10 μm to about 150 μm. As still another example, the average size of the particles of the metallic build material 16 ranges from about 15 μm to about 100 μm.

As shown in FIG. 1, the printing system 10 also includes an applicator 24, which may contain the binder fluid 36 (shown in FIG. 2C) disclosed herein.

The binder fluid 36 includes at least the liquid vehicle and the polymer particles. In some instances, the binder fluid 36 consists of the liquid vehicle and the polymer particles, without any other components.

Figure 2E:
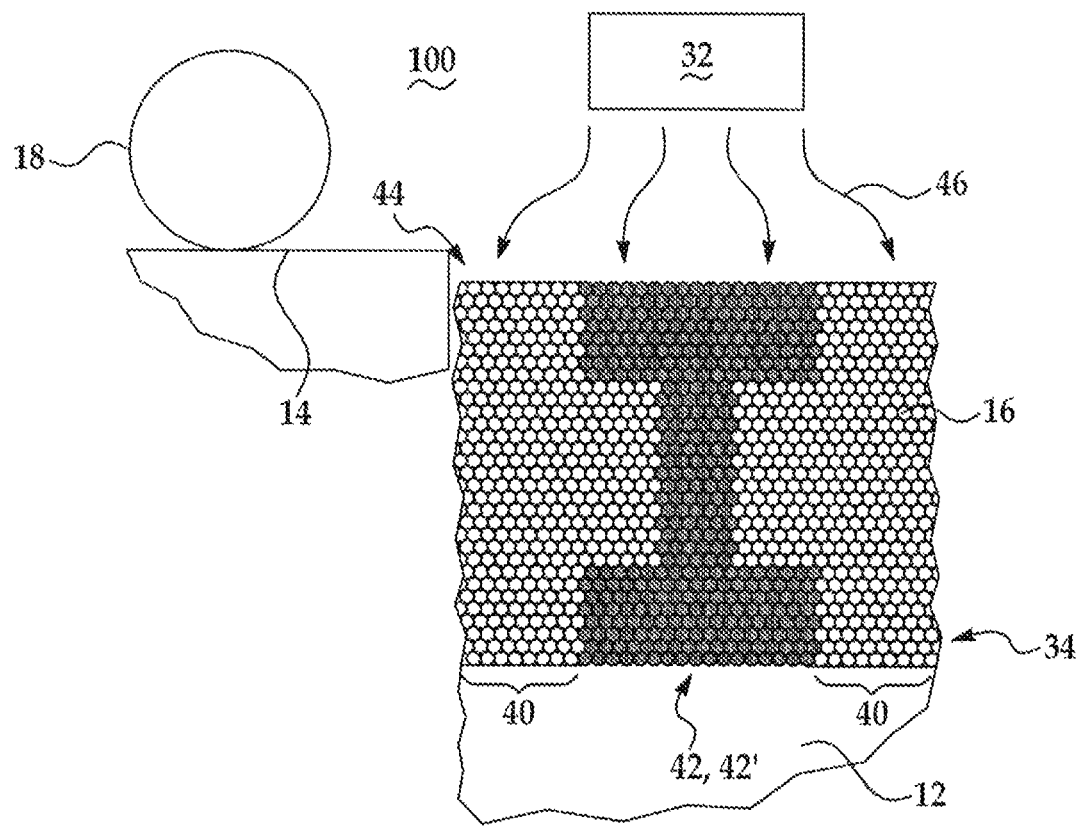
Figure 2F:
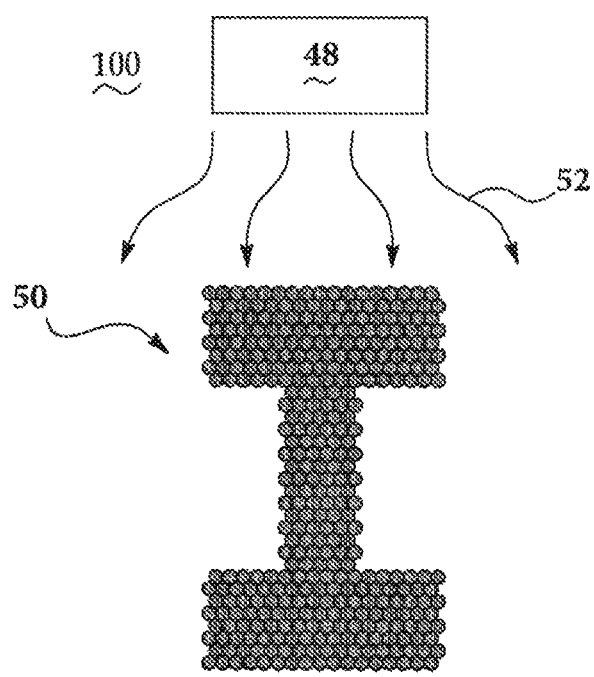

The polymer particles are sacrificial intermediate binders in that they are present in various stages of the three-dimensional object 42, 42' (shown in FIG. 2E) that is formed, and then are ultimately removed (through thermal decomposition) and thus are not present in the final sintered 3D part 50 (shown in FIG. 2F).

In the examples disclosed herein, the polymer particles may be dispersed in the liquid vehicle. The polymer particles may have several different morphologies. For example, the polymer particles may be individual spherical particles containing polymer compositions of high $T_g$ hydrophilic (hard) component(s) and/or low $T_g$ hydrophobic (soft) component(s) that may be interdispersed according to IPN (interpenetrating networks), although it is contemplated that the high $T_g$ hydrophilic and low $T_g$ hydrophobic components may be interdispersed in other ways. For another example, the polymer particles may be made of a low $T_g$ continuous or discontinuous hydrophobic core surrounded by or partially coalesced domains of a continuous or discontinuous high $T_g$ hydrophilic shell. For another example, the polymer particle morphology may resemble a raspberry, in which a low $T_g$ hydrophobic core is surrounded by several smaller high $T_g$ hydrophilic particles that are attached to the core. For still another example, the polymer particles may include 2, 3, or 4 particles that are at least partially attached to one another.

In examples herein, high $T_g$ hydrophilic component(s)/shell/particles and low $T_g$ hydrophilic component(s)/core/ particles may be defined in relation to each other (i.e., the high $T_g$ hydrophilic component(s)/shell/particles have a $T_g$ higher than the low $T_g$ hydrophilic component(s)/core/particles, and the low $T_g$ hydrophilic component(s)/core/particles have a $T_g$ lower than the high $T_g$ hydrophilic component(s)/shell/particles). In some examples, the high $T_g$ hydrophilic component(s)/shell/particles have a $T_g$ higher than 25° C. In other examples, the high $T_g$ hydrophilic component(s)/shell/particles have a $T_g$ higher than 45° C. In some examples, the low $T_g$ hydrophilic component(s)/core/particles have a $T_g$ lower than 25° C. In other examples, the low $T_g$ hydrophilic component(s)/core/particles have a $T_g$ lower than 5° C.

The polymer particles may be any latex polymer (i.e., polymer that is capable of being created by techniques known as emulsion polymerization and/or mini-emulsion polymerization) that is jettable via inkjet printing (e.g., thermal inkjet printing or piezoelectric inkjet printing). In some examples disclosed herein, the polymer particles are heteropolymers or co-polymers. The heteropolymers may include a more hydrophobic component and a more hydrophilic component. In these examples, the hydrophilic component renders the particles dispersible in the binder fluid 36, while the hydrophobic component is capable of coalescing upon exposure to photonic energy in order to temporarily bind the metallic build material particles 16 together to form the three-dimensional object 42'.

Examples of low $T_g$ monomers that may be used to form the hydrophobic component include C4 to C8 alkyl acrylates or methacrylates, styrene, substituted methyl styrenes, polyol acrylates or methacrylates, vinyl monomers, vinyl esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexyl methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, trydecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., a-methyl styrene, p-methyl styrene), vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

In some examples, methyl methacrylate, methyl acrylate, ethyl methacrylate and ethyl acrylate can be used.

In some examples, certain monomers may be considered hydrophilic or hydrophobic depending on the monomers they are paired with. Methyl methacrylate, methyl acrylate, ethyl methacrylate, and ethyl acrylate can belong to both hydrophobic and hydrophilic groups. In some examples, acrylonitrile and methacrylonitrile can be used.

In some examples, two or more hydrophobic monomers can be used, which can lead to phase separation to some degree because of incompatibility with one another thereby leading to forming of small domains within a particle. Alternatively, two or more hydrophilic monomers can be used.

In some examples, acid functionality may be used to modify (e.g., increase) the hydrophilicity of any polymer composition.

The heteropolymer may be formed of at least two of the previously listed monomers, or at least one of the previously listed monomers and a high $T_g$ hydrophilic monomer, such as an acidic monomer. Examples of acidic monomers that can be polymerized in forming the polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high $T_g$ hydrophilic monomers include acrylamide, methacrylamide, monohydroxylated monomers, monoethoxylated monomers, polyhydroxylated monomers, or polyethoxylated monomers.

In the heteropolymers disclosed herein, the low $T_g$ hydrophobic component(s) make up from about 0% to about 40% of the polymer, and the high $T_g$ hydrophilic component(s) make up from about 65% to about 100% of the polymer.

In an example, the selected monomer(s) is/are polymerized to form the a heteropolymer. Any suitable polymerization process may be used. For example, hydrophobic-hydrophilic polymer particles can be formed by any of a number of techniques, such as: i) creating a high $T_g$ hydrophilic polymer after forming a low $T_g$ hydrophobic polymer, ii) sequentially copolymerizing low $T_g$ hydrophobic and high $T_g$ hydrophilic monomers using ratios that lead to a more high $T_g$ hydrophilic, iii) increasing the hydrophilic character of the high $T_g$ monomer composition) so there is a higher concentration of high $T_g$ near the particle surface, or iv) any other common method to generate a more high $T_g$ hydrophilic outer component or shell relative to the inner component or core. These hydrophobic-hydrophilic polymer particles may be core-shell particles. It is to be understood, however, that these techniques may also form polymer particles with other morphologies, including but not limited to those noted herein.

The polymer particles may have a particle size that can be jetted via thermal inkjet printing or piezoelectric printing or continuous inkjet printing. In an example, the particle size of the polymer particles ranges from about 10 nm to about 300 nm.

In some examples, the polymer particles have a glass transition temperature ($T_g$) that is greater (e.g., >) than ambient temperature. In other examples, the polymer particles have a glass transition temperature ($T_g$) that is much greater (e.g., >>) than ambient temperature (i.e., at least 15° higher than ambient). As used therein, "ambient temperature" may refer to room temperature (e.g., ranging about 18°

C. to about 22° C.), or to the temperature of the environment in which the 3D printing method is performed. Examples of the 3D printing environment ambient temperature may range from about 40° C. to about 50° C. The glass transition temperature $T_g$ of the bulk material (e.g., the more hydrophobic portion) of the polymer particles may range from 25° C. to about 125° C. In an example, the glass transition temperature $T_g$ of the bulk material (e.g., the more hydrophobic portion) of the polymer particles is about 40° C. or higher. The glass transition temperature $T_g$ of the bulk material may be any temperature that enables the polymer particles to be inkjet printed without becoming too soft at the printer operating temperatures.

The polymer particles may have a melting point ranging from about 50° C. to about 150° C. In an example, the polymer particles may have a melting point of about 90° C.

The weight average molecular weight of the polymer particles may range from about 5,000 Mw to about 500,000 Mw. In some examples, the weight average molecular weight of the polymer particles ranges from about 100,000 Mw to about 500,000 Mw. In some other examples, the weight average molecular weight of the polymer particles ranges from about 150,000 Mw to 300,000 Mw.

The polymer particles may be present in the binder fluid 36 in an amount ranging from about 2 wt % to about 30 wt %, or from about 3 wt % to about 20 wt %, or from about 5 wt % to about 15 wt % (based upon the total wt % of the binder fluid 36). In another example, the polymer particles may be present in the binder fluid 36 in an amount ranging from about 20 vol % to about 40 vol % (based upon the total vol % of the binder fluid 36). It is believed that these polymer particle loadings offer a balance between the binder fluid 36 having jetting reliability and binding efficiency.

When the binder fluid 36 is applied on a metallic build material layer or bed, the amount of binder fluid deposited in each pass is from about 0.1 microliters to about 1000 microliters, or from about 1 microliter to about 500 microliters, or from about 5 microliters to about 100 microliters, or from about 10 microliters to about 50 microliters, or less than about 1000 microliters, or less than about 500 microliters, or less than about 100 microliters, or more than about 0.1 microliters, or more than about 1 microliter, or more than about 10 microliters.

In some examples, the binder fluid 36 includes a coalescing solvent in addition to the polymer particles. In these examples, the coalescing solvent plasticizes the polymer particles and enhances the coalescing of the polymer particles upon exposure to photonic energy in order to temporarily bind the metallic build material particles 16 together to form the three-dimensional object 42'. In some examples, the binder fluid 36 may consist of the polymer particles and the coalescing solvent (with no other components). In these examples, the liquid vehicle consists of the coalescing solvent (with no other components), and the coalescing solvent makes up the balance of the binder fluid 36.

In some examples, the coalescing solvent may be a lactone, such as 2-pyrrolidinone or 1-(2-hydroxyethyl)-2-pyrrolidone. In other examples, the coalescing solvent may be a glycol ether or a glycol ether esters, such as tripropylene glycol mono methyl ether, dipropylene glycol mono methyl ether, dipropylene glycol mono propyl ether, tripropylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, or ethylene glycol mono n-butyl ether acetate. In still other examples, the coalescing solvent may be a water-soluble polyhydric alcohol, such as 2-methyl-1,3-propanediol. In still other examples, the coalescing solvent may be a combination of any of the examples above. In still other examples, the coalescing solvent is selected from the group consisting of 2-pyrrolidinone, 1-(2-hydroxyethyl)-2-pyrrolidone, tripropylene glycol mono methyl ether, dipropylene glycol mono methyl ether, dipropylene glycol mono propyl ether, tripropylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, ethylene glycol mono n-butyl ether acetate, 2-methyl-1,3-propanediol, and a combination thereof.

The coalescing solvent may be present in the binder fluid 36 in an amount ranging from about 0.1 wt % to about 50 wt % (based upon the total wt % of the binder fluid 36). In some examples, greater or lesser amounts of the coalescing solvent may be used depending, in part, upon the jetting architecture of the applicator 24.

In an example, the polymer particles are present in the binder fluid in an amount ranging from about 2 wt % to about 30 wt %, and the coalescing solvent is present in the binder fluid in an amount ranging from about 0.1 wt % to about 50 wt %.

As mentioned above, the binder fluid 36 includes the polymer particles and the liquid vehicle. As used herein, "liquid vehicle" may refer to the liquid fluid in which the polymer particles are dispersed to form the binder fluid 36. A wide variety of liquid vehicles, including aqueous and non-aqueous vehicles, may be used with the binder fluid 36. In some instances, the liquid vehicle consists of a primary solvent with no other components.

In other examples, the binder fluid 36 may include other ingredients, depending, in part, upon the applicator 24 that is to be used to dispense the binder fluid 36. Examples of other suitable binder fluid components include co-solvent(s), surfactant(s), antimicrobial agent(s), anti-kogation agent(s), viscosity modifier(s), pH adjuster(s) and/or sequestering agent(s). The presence of a co-solvent and/or a surfactant in the binder fluid 36 may assist in obtaining a particular wetting behavior with the metallic build material 16.

The primary solvent may be water or a non-aqueous solvent (e.g., ethanol, acetone, n-methyl pyrrolidone, or aliphatic hydrocarbons). In some examples, the binder fluid 36 consists of the polymer particles and the primary solvent (with on other components). In these examples, the primary solvent makes up the balance of the binder fluid 36.

Classes of organic co-solvents that may be used in the water-based binder fluid 36 include aliphatic alcohols, aromatic alcohols, diols, glycol ethers, polyglycol ethers, lactams such as 2-pyrrolidone, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Examples of some suitable co-solvents include water-soluble high-boiling point solvents (i.e., humectants), which have a boiling point of at least about 120° C., or higher. Some examples of high-boiling point solvents include 2-pyrrolidone (boiling point of about 245° C.), 2-methyl-1,3-propanediol (boiling point of about 212° C.), and combinations thereof. The co-solvent(s) may be present in the binder fluid 36 in a total amount ranging from about 1 wt % to about 50 wt % based upon the total wt % of the binder fluid 36, depending upon the jetting architecture of the applicator 24.

Surfactant(s) may be used to improve the wetting properties and the jettability of the binder fluid 36. Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL®440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 or TERGITOL™ 15-S-7 from The Dow Chemical Company). In some examples, it may be useful to utilize a surfactant having a hydrophilic-lipophilic balance (HLB) less than 10.

Whether a single surfactant is used or a combination of surfactants is used, the total amount of surfactant(s) in the binder fluid 36 may range from about 0.01 wt % to about 10 wt % based on the total wt % of the binder fluid 36. In another example, the total amount of surfactant(s) in the binder fluid 36 may range from about 0.5 wt % to about 2.5 wt % based on the total wt % of the binder fluid 36.

The liquid vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® M20 (Thor), and combinations thereof. Examples of suitable biocides include an aqueous solution of 1,2-benzisothiazoin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.). The biocide or antimicrobial may be added in any amount ranging from about 0.05 wt % to about 0.5 wt % (as indicated by regulatory usage levels) with respect to the total wt % of the binder fluid 36.

An anti-kogation agent may be included in the binder fluid 36. Kogation refers to the deposit of dried binder fluid 36 on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the binder fluid 36 may range from greater than 0.20 wt % to about 0.62 wt % based on the total wt % of the binder fluid 36. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

Sequestering agents, such as EDTA (ethylene diamine tetra acetic acid), may be included to eliminate the deleterious effects of heavy metal impurities, and buffer solutions may be used to control the pH of the binder fluid 36. From 0.01 wt % to 2 wt % of each of these components, for example, can be used. Viscosity modifiers and buffers may also be present, as well as other additives to modify properties of the binder fluid 36. Such additives can be present in amounts ranging from about 0.01 wt % to about 20 wt %.

The applicator 24 may be scanned across the build area platform 12 in the direction indicated by the arrow 26. e.g., along the y-axis. The applicator 24 may be, for instance, an inkjet applicator, such as a thermal inkjet printhead or a piezoelectric printhead, and may extend a width of the build area platform 12. While the applicator 24 is shown in FIG. 1 as a single applicator, it is to be understood that the applicator 24 may include multiple applicators that span the width of the build area platform 12. Additionally, the applicators 24 may be positioned in multiple printbars. The applicator 24 may also be scanned along the x-axis, for instance, in configurations in which the applicator 24 does not span the width of the build area platform 12 to enable the applicator 24 to deposit the binder fluid 36 over a large area of a layer of the metallic build material 16. The applicator 24 may thus be attached to a moving XY stage or a translational carriage (neither of which is shown) that moves the applicator 24 adjacent to the build area platform 12 in order to deposit the binder fluid 36 in predetermined areas of a layer of the metallic build material 16 that has been formed on the build area platform 12 in accordance with the method(s) disclosed herein. The applicator 24 may include a plurality of nozzles (not shown) through which the binder fluid 36 is to be ejected.

The applicator 24 may deliver drops of the binder fluid 36 at a resolution ranging from about 150 dots per inch (DPI) to about 1200 DPI. In other examples, the applicator 24 may deliver drops of the binder fluid 36 at a higher or lower resolution. The drop velocity may range from about 2 m/s to about 24 m/s and the firing frequency may range from about 1 kHz to about 100 kHz. In one example, each drop may be in the order of about 10 picoliters (pl) per drop, although it is contemplated that a higher or lower drop size may be used. For example, the drop size may range from about 1 pl to about 400 pl. In some examples, applicator 24 is able to deliver variable size drops of the binder fluid 36.

Each of the previously described physical elements may be operatively connected to a controller 28 of the printing system 10. The controller 28 may control the operations of the build area platform 12, the build material supply 14, the build material distributor 18, and the applicator 24. As an example, the controller 28 may control actuators (not shown) to control various operations of the 3D printing system 10 components. The controller 28 may be a computing device, a semiconductor-based microprocessor, a central processing unit (CPU), an application specific integrated circuit (ASIC), and/or another hardware device. Although not shown, the controller 28 may be connected to the 3D printing system 10 components via communication lines.

The controller 28 manipulates and transforms data, which may be represented as physical (electronic) quantities within the printer's registers and memories, in order to control the physical elements to create the 3D part 50. As such, the controller 28 is depicted as being in communication with a data store 30. The data store 30 may include data pertaining to a 3D part 50 to be printed by the 3D printing system 10. The data for the selective delivery of the metallic build material particles 16 and/or the binder fluid 36 may be derived from a model of the 3D part 50 to be formed. For instance, the data may include the locations on each layer of metallic build material particles 16 that the applicator 24 is to deposit the binder fluid 36. In one example, the controller 28 may use the data to control the applicator 24 to selectively apply the binder fluid 36. The data store 30 may also include machine readable instructions (stored on a non-transitory computer readable medium) that are to cause the controller 28 to control the amount of metallic build material particles 16 that is supplied by the build material supply 14, the movement of the build area platform 12, the movement of the build material distributor 18, or the movement of the applicator 24.

As shown in FIG. 1, the printing system 10 may also include a photonic energy emitter 32, 32'. In some examples, the photonic energy emitter 32 can include at least one energy source, such as a strobe lamp, that is able to emit photonic energy 46 on the metallic build material particles 16 and the selectively applied binder fluid 36. For instance, the at least one energy source may be a Xe strobe lamp that is to apply short light pulses onto each layer of build material particles 16 and the selectively applied binder fluid 36. In some examples, the photonic energy emitter 32 may be movable with respect to the layers of build material particles 16 and the selectively applied binder fluid 36.

In any regard, the controller 28 may control the photonic energy emitter 32 to apply short bursts of energy 46 at the various energy levels. For instance, the controller 28 may control the at least one energy source to flash a single time at the certain low energy level for about 15 ms. Similarly, the controller 28 may control the at least one energy source to flash a single time at the certain additional energy level for about 15 ms. Likewise, the controller 28 may control the at least one energy source to flash a single time at the certain high energy level for about 15 ms. In other examples, the controller 28 may vary the number of times and/or the durations at which the photonic energy emitter 32 is flashed at the various energy levels. For instance, the durations may vary for types of metals, particle sizes, and/or distribution of the metallic build material 16.

According to examples, the photonic energy emitter 32 may be a single energy source that may be operated at multiple energy levels, e.g., the certain low energy level, the certain additional energy level, or the certain high energy level. In other examples, the at least one energy source may be a plurality of energy sources. In these examples, the controller 28 may control a first energy source to apply energy at the certain low energy level, may control a second energy source to apply energy at the certain additional energy level, may control a third energy source to apply energy at the certain high energy level, and so forth. In any of these examples, the at least one energy source can be a photonic fusing source, such as, a Xenon (Xe) strobe lamp, although other types of strobe lamps may be implemented.

In some examples, the at least one energy source may be a continuous wave discharge lamp including xenon, argon, neon, krypton, sodium vapor, metal halide, or mercury-vapor. In another example, the at least one energy source may be an array of pulse lasers, continuous wave lasers, light-emitting diodes (LED), or a combination thereof. In this example, the array may produce a uniformly dispersed beam. In still another example, the at least one energy source may be a flash discharge lamp including xenon or krypton. In still another example, the at least one energy source may be a tungsten-halogen continuous wave lamp. In yet another example, the at least one energy source may be a synchrotron light source that emits light having a wavelength above 200 nm.

The photonic energy emitter 32 is capable of emitting enough energy to fuse the metallic build material 16 by flash fusing the polymer particles in the binder fluid 36. When the at least one energy source is a single pulse light source, the at least one energy source may be capable of delivering from about 0.5 J/cm$^2$ to about 25 J/cm$^2$. The amount of energy the at least one energy source is capable of delivering may be less than about 20 J/cm$^2$ when the at least one energy source is a multiple pulse light source, or less than about 10 J/cm$^2$ when the at least one energy source is a multiple pulse light source, or less than about 5 J/cm$^2$ when the at least one energy source is a multiple pulse light source, or less than about 2 J/cm$^2$ when the at least one energy source is a multiple pulse light source, or less than about 1 J/cm$^2$ when the at least one energy source is a multiple pulse light source.

This type of photonic energy emitter 32 comprising the at least one energy source may be used for flash fusing the polymer particles in the binder fluid 36 to bind the metallic build material 16 layer-by-layer and/or by flash fusing the entire build material cake 44 (see FIG. 2E) after the printing is finished.

Referring now to FIGS. 2A through 2F, an example of the 3D printing method is depicted. Prior to execution of the method 100 or as part of the method 100, the controller 28 may access data stored in the data store 30 pertaining to a 3D part 50 that is to be printed. The controller 28 may determine the number of layers of metallic build material particles 16 that are to be formed, and the locations at which binder fluid 36 from the applicator 24 is to be deposited on each of the respective layers.

As shown in FIGS. 2A and 2B, the method 100 includes applying the metallic build material 16. In FIG. 2A, the build material supply 14 may supply the metallic build material particles 16 into a position so that they are ready to be spread onto the build area platform 12. In FIG. 2B, the build material distributor 18 may spread the supplied metallic build material particles 16 onto the build area platform 12. The controller 28 may execute control build material supply instructions to control the build material supply 14 to appropriately position the metallic build material particles 16, and may execute control spreader instructions to control the build material distributor 18 to spread the supplied metallic build material particles 16 over the build area platform 12 to form a layer 34 of metallic build material particles 16 thereon. As shown in FIG. 2B, one layer 34 of the metallic build material particles 16 has been applied.

The layer 34 has a substantially uniform thickness across the build area platform 12. In an example, the thickness of the layer 34 ranges from about 30 µm to about 300 µm, although thinner or thicker layers may also be used. For example, the thickness of the layer 34 may range from about 20 µm to about 500 µm. The layer thickness may be about 2× the particle diameter (as shown in FIG. 2) at a minimum for finer part definition. In some examples, the layer thickness may be about 1.2× (i.e., 1.2 times) the particle diameter.

Referring now to FIG. 2C, the method 100 continues by selectively applying the binder fluid 36 on a portion 38 of the metallic build material 16. As illustrated in FIG. 2C, the binder fluid 36 may be dispensed from the applicator 24. The applicator 24 may be a thermal inkjet printhead or a piezo-electric printhead, and the selectively applying of the binder fluid 36 may be accomplished by the associated inkjet printing technique. As such, the selectively applying of the binder fluid 36 may be accomplished by thermal inkjet printing or piezo electric inkjet printing.

The controller 28 may execute instructions to control the applicator 24 (e.g., in the directions indicated by the arrow 26) to deposit the binder fluid 36 onto predetermined portion(s) 38 of the metallic build material 16 that are to become part of a patterned three-dimensional object 42 and are to ultimately be sintered to form the 3D part 50. The applicator 24 may be programmed to receive commands from the controller 28 and to deposit the binder fluid 36 according to a pattern of a cross-section for the layer of the 3D part 50 that is to be formed. As used herein, the cross-section of the layer of the 3D part 50 to be formed refers to the cross-section that is parallel to the surface of the build area platform 12. In the example shown in FIG. 2C, the applicator 24 selectively applies the binder fluid 36 on those portion(s) 38 of the layer 34 that are to be fused to become the first layer of the 3D part 50. As an example, if the 3D part that is to be formed is to be shaped like a cube or cylinder, the binder fluid 36 will be deposited in a square pattern or a circular pattern (from a top view), respectively, on at least a portion of the layer 34 of the metallic build material particles 16. In the example shown in FIG. 2C, the binder fluid 36 is deposited in a square pattern on the portion 38 of the layer 34 and not on the portions 40.

As mentioned above, the binder fluid 36 includes the polymer particles and the liquid vehicle. As also mentioned above, in some examples the binder fluid 36 also includes the coalescing solvent (as or in addition to the liquid vehicle). It is to be understood that a single binder fluid 36 may be selectively applied to pattern the layer 34, or multiple binder fluids 36 may be selectively applied to pattern the layer 34.

While not shown, the method 100 may include preparing the binder fluid 36 prior to selectively applying the binder fluid 36. Preparing the binder fluid 36 may include preparing the polymer particles and then adding the polymer particles to the liquid vehicle.

When each of the polymer particles contains a low $T_g$ hydrophobic component and a high $T_g$ hydrophilic component, the polymer particles may be prepared by any suitable method. As examples, the polymer particles may be prepared by one of the following methods.

In an example, each polymer may be prepared independently by polymerizing the low $T_g$ hydrophobic monomers to form the low $T_g$ hydrophobic component; then polymerizing the high $T_g$ hydrophilic monomers to form the high $T_g$ hydrophilic component. In emulsion polymerization, the first (low $T_g$) component acts as a seed polymer into or onto which the second (high $T_g$) component is polymerized.

In another example, each of the polymer particles may be prepared by first polymerizing the low $T_g$ hydrophobic monomers and then high $T_g$ hydrophilic monomers at a ratio of the low $T_g$ hydrophobic monomers to the high $T_g$ hydrophilic monomers that ranges from 5:95 to 30:70. In this example, the soft low $T_g$ hydrophobic polymers may dissolve in the hard high $T_g$ hydrophilic polymers.

In still another example, each of the polymer particles may be prepared by starting the polymerization process with the low $T_g$ hydrophobic monomers, then adding the high $T_g$ hydrophilic monomers, and then finishing the polymerization process. In this example, the polymerization process may cause a higher concentration of the high $T_g$ hydrophilic monomers to polymerize at or near the surface of the low $T_g$ hydrophobic component. This process is one implementation of a technique frequently referred to as a power feed.

In still another example, each of the polymer particles may be prepared by starting a copolymerization process with the low $T_g$ hydrophobic monomers and the high $T_g$ hydrophilic monomers, then adding additional high $T_g$ hydrophilic monomers, and then finishing the copolymerization process. In this example, the copolymerization process may cause a higher concentration of the high $T_g$ hydrophilic monomers to copolymerize at or near the surface of the low $T_g$ hydrophobic component. This process is another implementation of a power feed. This process is another implementation of a power feed.

The low $T_g$ hydrophobic monomers and/or the high $T_g$ hydrophilic monomers used in any of these examples may be any of the low $T_g$ hydrophobic monomers and/or the high $T_g$ hydrophilic monomers (respectively) listed above. In an example, the low $T_g$ hydrophobic monomers are selected from the group consisting of C4 to C8 alkyl acrylate monomers, C4 to C8 alkyl methacrylate monomers, styrene monomers, substituted methyl styrene monomers, vinyl monomers, vinyl ester monomers, and combinations thereof; and the high $T_g$ hydrophilic monomers are selected from the group consisting of acidic monomers, unsubstituted amide monomers, alcoholic acrylate monomers, alcoholic methacrylate monomers, C1 to C2 alkyl acrylate monomers, C1 to C2 alkyl methacrylate monomers, and combinations thereof.

The resulting polymer particles may exhibit a core-shell structure, a partially occluded structure or intermingled polymeric structure, or some other morphology.

When the binder fluid 36 is selectively applied in the targeted portion(s) 38, the polymer particles (present in the binder fluid 36) infiltrate the inter-particles spaces among the metallic build material particles 16. The volume of the binder fluid 36 that is applied per unit of metallic build material 16 in the patterned portion 38 may be sufficient to fill a major fraction, or most of the porosity existing within the thickness of the portion 38 of the layer 34.

It is to be understood that portions 40 of the metallic build material 16 that do not have the binder fluid 36 applied thereto also do not have the polymer particles introduced thereto. As such, these portions do not become part of the patterned three-dimensional object 42 that is ultimately formed.

The processes shown in FIGS. 2A through 2C may be repeated to iteratively build up several patterned layers and to form the patterned three-dimensional object 42 (see FIG. 2E).

FIG. 2D illustrates the initial formation of a second layer of metallic build material 16 on the layer 34 patterned with the binder fluid 36. In FIG. 2D, following deposition of the binder fluid 36 onto predetermined portion(s) 38 of the layer 34 of metallic build material 16, the controller 28 may execute instructions to cause the build area platform 12 to be moved a relatively small distance in the direction denoted by the arrow 20. In other words, the build area platform 12 may be lowered to enable the next layer of metallic build material 16 to be formed. For example, the build material platform 12 may be lowered a distance that is equivalent to the height of the layer 34. In addition, following the lowering of the build area platform 12, the controller 28 may control the build material supply 14 to supply additional metallic build material 16 (e.g., through operation of an elevator, an auger, or the like) and the build material distributor 18 to form another layer of metallic build material particles 16 on top of the previously formed layer 34 with the additional metallic build material 16. The newly formed layer may be patterned with binder fluid 36.

Referring back to FIG. 2C, in another example, the layer 34 may be exposed to flash fusing using photonic energy emitter 32' after the binder fluid 36 is applied to the layer 34 and before another layer is formed. The photonic energy emitter 32' comprising the at least one energy source may be used for activating the binder fluid 36 during printing layer-by-layer, and for producing a stabilized three-dimensional object layer. Flash fusing to form the three-dimensional object layer may take place at a temperature that is capable of activating (or curing) the binder fluid 36, but that is not capable of melting or sintering the metallic build material 16. In this example, the processes shown in FIGS. 2A through 2C (including the flash fusing of the layer 34) may be repeated to iteratively build up several flash fused layers and to produce the three-dimensional object 42'. The three-dimensional object 42' can then be exposed to the processes described in reference to FIG. 2F.

In some examples, repeatedly forming and patterning new layers (without flash fusing each layer) results in the formation of a build material cake 44, as shown in FIG. 2E, which includes the patterned three-dimensional object 42 residing within the non-patterned portions 40 of each of the layers 34 of metallic build material 16. The patterned three-dimensional object 42 is a volume of the build material cake 44 that is filled with the metallic build material 16 and the binder fluid 36 within the inter-particle spaces. The remainder of the build material cake 44 is made up of the non-patterned metallic build material 16.

Also as shown in FIG. 2E, the build material cake 44 may be exposed to the photonic energy emitter 32 comprising the at least one energy source to flash fuse via an energy flux 46. The energy applied may be sufficient to melt the polymer particles in the binder fluid 36 in the patterned three-dimensional object 42 and to produce the three-dimensional object 42'. In one example, the photonic energy emitter 32 may be used to apply the energy to the build material cake 44. In the example shown in FIG. 2E, the build material cake 44 may remain on the build area platform 12 while being flash fused by the photonic energy emitter 32. In another example, the build area platform 12, with the build material cake 44 thereon, may be detached from the applicator 24 and placed in the photonic energy emitter 32.

The activation/curing temperature may depend, in part, on at least one of: the $T_g$ of the polymer particles, the melt viscosity of the polymer particles, and/or whether and which coalescing solvent is used. In an example, flash fusing to form the three-dimensional object 42' may take place at a temperature that is capable of activating (or curing) the binder fluid 36, but that is not capable of sintering the metallic build material 16 or of thermally degrading the polymer particles of the binder fluid 36. In an example, the activation temperature is about the melting point of the bulk material of the polymer particles of the binder fluid 36 and below the thermal decomposition temperature of the polymer particles (i.e., below a temperature threshold at which thermal decomposition occurs). For a majority of suitable latex-based polymer particles, the upper limit of the activation/curing temperature ranges from about 250° C. to about 270° C. Above this temperature threshold, the polymer particles would chemically degrade into volatile species and leave the patterned three-dimensional object 42, and thus would stop performing their function. In other examples, the binder fluid 36 activation temperature may be greater than the melting point of the polymer particles. As an example, the binder fluid activation temperature may range from about 40° C. to about 200° C. As another example, the binder fluid activation temperature may range from about 100° C. to about 200° C. As still another example, the binder fluid activation temperature may range from about 80° C. to about 200° C. As still another example, the binder fluid activation temperature may range from about 50° C. to about 150° C. As still another example, the binder fluid activation temperature may be about 90° C.

The length of time at which the energy flux 46 is applied and the rate at which the patterned three-dimensional object 42 is flash fused may be dependent, for example, on at least one of: characteristics of the photonic energy emitter source 32, 32', characteristics of the polymer particles, characteristics of the metallic build material 16 (e.g., metal type and/or particle size), and/or the characteristics of the 3D part 50 (e.g., wall thickness). The patterned three-dimensional object 42 may be flash fused at the binder fluid activation temperature for an activation/curing time period ranging of less than about 1 second.

In some examples, the patterned three-dimensional object 42 may be subjected to flash fusing layer-by-layer, or every two layers, or every three layers, and so forth. In some examples, the patterned three-dimensional object 42 may be subjected to flash fusing at the end of the patterning.

Flash fusing to about the melting point of the polymer particles causes the polymer particles to coalesce into a continuous polymer phase among the metallic build material particles 16 of the patterned three-dimensional object 42. As mentioned above, the coalescing solvent (when included in the binder fluid 36) plasticizes the polymer particles and enhances the coalescing of the polymer particles. The continuous polymer phase may act as an adhesive between the metallic build material particles 16 to form the stabilized, three-dimensional object 42'.

Flash fusing to form the three-dimensional object 42' may also result in the evaporation of a significant fraction of the fluid from the patterned three-dimensional object 42. The evaporated fluid may include any of the binder fluid components. Fluid evaporation may result in some densification, through capillary action, of the three-dimensional object 42'.

The stabilized, three-dimensional object 42' exhibits handleable mechanical durability.

The three-dimensional object 42' may then be extracted from the build material cake 44. The three-dimensional object 42' may be extracted by any suitable means. In an example, the three-dimensional object 42' may be extracted by lifting the three-dimensional object 42' from the unpatterned metallic build material particles 16. An extraction tool including a piston and a spring may be used.

When the three-dimensional object 42' is extracted from the build material cake 44, the three-dimensional object 42' may be removed from the build area platform 12 and placed in a heating mechanism. The heating mechanism may be a heater 48.

In some examples, the three-dimensional object 42' may be cleaned to remove unpatterned metallic build material particles 16 from its surface. In an example, the three-dimensional object 42' may be cleaned with a brush and/or an air jet.

After the extraction and/or cleaning of the three-dimensional object 42', the three-dimensional object 42' may in some examples be heated to remove the activated polymer particles (which have coalesced into the continuous polymer phase) to produce an at least substantially polymer-free part.

In some examples, after extraction and/or cleaning of the three-dimensional object 42', the three dimensional object 42' can be heated to a sintering temperature (i.e., sintered) using heater 48 to form the final 3D part 50, also as shown in FIG. 2F.

In some examples, heating to de-bind and heating to sinter take place at two different temperatures, where the temperature for de-binding is lower than the temperature for sintering. Both the de-binding and the sintering heating stages are generally depicted in FIG. 2F, where heat or radiation to generate heat may be applied as denoted by the arrows 46 from the heat source 48.

In some examples, heating to de-bind can be accomplished at a thermal decomposition temperature that is sufficient to thermally decompose the continuous polymer phase. As such, the temperature for de-binding depends upon the material of the polymer particles of the binder fluid 36. In an example, the thermal decomposition temperature ranges from about 250° C. to about 600° C. In another example, the thermal decomposition temperature ranges from about 280° C. to about 600° C., or to about 500° C. The continuous polymer phase may have a clean thermal decomposition mechanism (e.g., leaves <5 wt % solid residue of the initial binder, and in some instances <1 wt % solid residue of the initial binder). The smaller residue percentage (e.g., close to 0%) is more suitable. During the de-binding stage, the long chains of the continuous polymer phase decompose first intro shorter molecular fragments, which turn into a liquid phase of lower viscosity. Capillary pressure developing during evaporation of this liquid pulls the metallic build material particles 16 together leading to further densification and formation of the at least substantially polymer-free part.

While not being bound to any theory, it is believed that the at least substantially polymer-free part may maintain its shape due, for example, to at least one of: i) the low amount of stress experience by the at least substantially polymer-free part due to it not being physically handled, ii) low level necking occurring between the metallic build material particles 16 at the thermal decomposition temperature of the polymer particles, and/or iii) capillary forces pushing the metallic build material particles 16 together generated by the removal of the continuous polymer phase. The at least substantially polymer-free part may maintain its shape although the continuous polymer phase is at least substantially removed and the metallic build material particles 16 is not yet sintered. Heating to form the substantially polymer-free part may begin the initial stages of sintering, which can result in the formation of weak bonds that are strengthened during final sintering.

Heating to sinter is accomplished at a sintering temperature that is sufficient to sinter the remaining metallic build material particles 16. The sintering temperature is highly depending upon the composition of the metallic build material particles 16. During heating/sintering, the three-dimensional object 42' or the at least substantially polymer-free part may be heated using heater 48 to a temperature ranging from about 80% to about 99.9% of the melting point or the solidus, eutectic, or peritectic temperature of the metallic build material 16. In another example, the three-dimensional object 42' may be heated to a temperature ranging from about 90% to about 95% of the melting point or the solidus, eutectic, or peritectic temperature of the metallic build material 16. In still another example, the three-dimensional object 42' may be heated to a temperature ranging from about 60% to about 85% of the melting point or the solidus, eutectic, or peritectic temperature of the metallic build material 16. The sintering heating temperature may also depend upon the particle size and time for sintering (i.e., high temperature exposure time).

As an example, the sintering temperature may range from about 850° C. to about 2500° C. In another example, the sintering temperature is at least 900° C. An example of a sintering temperature for bronze is about 850° C., and an example of a sintering temperature for stainless steel is about 1300° C. While these temperatures are offered as sintering temperature examples, it is to be understood that the sintering heating temperature depends upon the metallic build material 16 that is utilized, and may be higher or lower than the examples herein. Heating at a suitable temperature sinters and fuses the metallic build material particles 16 to form a completed 3D part 50, which may be even further densified relative to the three-dimensional object 42'. For example, as a result of sintering, the density may go from 50% density to over 90%, and in some cases very close to 100% of the theoretical density.

The length of time at which the heat 52 (for sintering) is applied and the rate at which the three-dimensional object 42' is heated may be dependent, for example, on at least one of: characteristics of the heat or radiation source 48, characteristics of the polymer particles, characteristics of the metallic build material 16 (e.g., metal type and/or particle size), and/or the characteristics of the 3D part 50 (e.g., wall thickness).

In some examples, the three-dimensional object 42' may be heated at the thermal decomposition temperature for a thermal decomposition time period ranging from about 10 minutes to about 72 hours. In an example, the thermal decomposition time period is 60 minutes. In another example, thermal decomposition time period is 180 minutes. The three-dimensional object 42' may be heated to the thermal decomposition temperature at a rate ranging from about 0.5° C./minute to about 20° C./minute. The heating rate may depend, in part, on at least one of: the amount of the continuous polymer phase in the three-dimensional object 42', the porosity of the three-dimensional object 42', and/or the characteristics of the three-dimensional object 42'/3D part 50 (e.g., size or wall thickness).

The three-dimensional object 42' may be heated at the sintering temperature for a sintering time period ranging from about 20 minutes to about 15 hours. In an example, the sintering time period is 240 minutes. In another example, the sintering time period is 360 minutes. The three-dimensional object 42' may be heated to the sintering temperature at a rate ranging from about 1° C./minute to about 20° C./minute. In an example, the three-dimensional object 42' is heated to the sintering temperature at a rate ranging from about 10° C./minute to about 20° C./minute. A high ramp rate up to the sintering temperature may be effective to produce a more favorable grain structure or microstructure. However, in some instances, slower ramp rates may be more effective. As such, in another example, the three-dimensional object 42' is heated to the sintering temperature at a rate ranging from about 1° C./minute to about 3° C./minute. In yet another example, the three-dimensional object 42' is heated to the sintering temperature at a rate of about 1.2° C./minute. In still another example, the three-dimensional object 42' is heated to the sintering temperature at a rate of about 2.5° C./minute.

In some examples, the heat 52 (for each of de-binding and sintering) is applied in an environment containing an inert gas, a low reactivity gas, a reducing gas, or a combination thereof. In other words, the heating of the three-dimensional object 42' to the sintering temperature is accomplished in an environment containing an inert gas, a low reactivity gas, a reducing gas, or a combination thereof. The sintering may be accomplished in an environment containing an inert gas, a low reactivity gas, and/or a reducing gas so that the metallic build material 16 will sinter rather than undergoing an alternate reaction (e.g., an oxidation reaction) which would fail to produce the metallic 3D part 50. Examples of inert gas include argon gas and helium gas. An example of a low reactivity gas includes nitrogen gas, and examples of reducing gases include hydrogen gas and carbon monoxide gas.

In some examples, sintering at the low gas pressure or under vacuum may allow for more complete or faster pore collapse, and thus higher density parts. However, vacuum may not be used during sintering when the metallic build material 16 (e.g., Cr) is capable of evaporating in such conditions. In an example, the low pressure environment is at a pressure ranging from about 1E-5 torr ($1*10^{-5}$ torr) to about 10 torr.

Although not shown, the operations depicted in FIGS. 2E and 2F may be automated and the controller 28 may control the operations.

Figure 3:
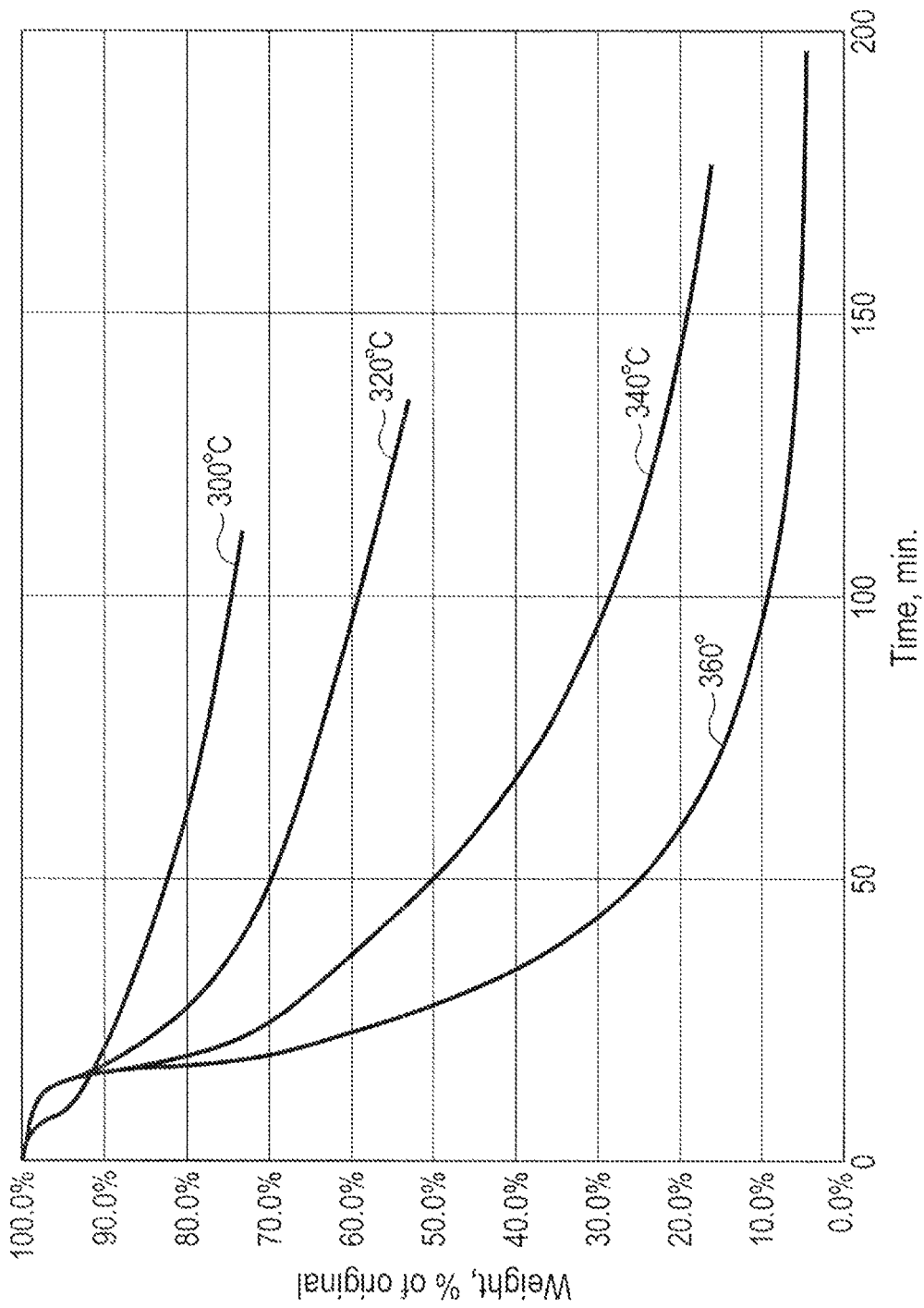
FIG. 3 is a graph of time versus weight percent of original styrene-acrylic latex binder at different temperatures.

As shown in FIG. 3, a graph shows the effect of temperature on thermal degradation of a styrene-acrylic latex binder. As shown in the graph, higher weight loss rates correspond to faster thermal degradation. Without wishing to be bound by theory, this suggests that heating to thermal degradation temperatures of the polymer particles can lead to a three-dimensional object that does not have high mechanical strength. It is, therefore, more effective to flash fuse the polymer particles by melting as a result of high energy densities for short bursts of time because the polymer particles are not subjected to photonic energy for a sufficient length of time to cause polymeric degradation.

Figure 4A:
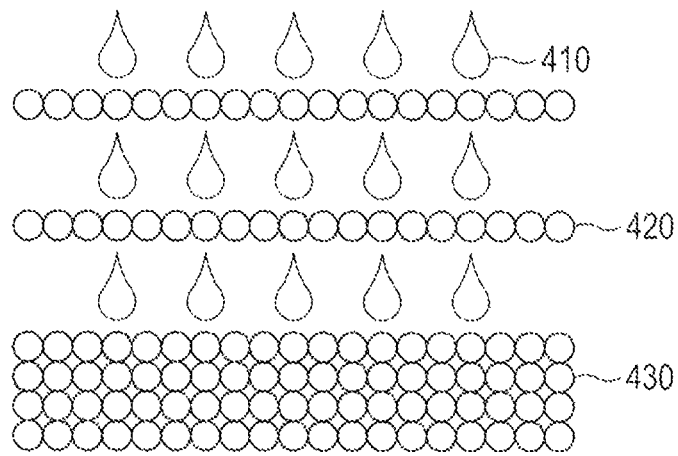
FIGS. 4A through 4C are schematic views depicting the formation of a three-dimensional object using an example of a 3D printing method disclosed herein.
Figure 4B:
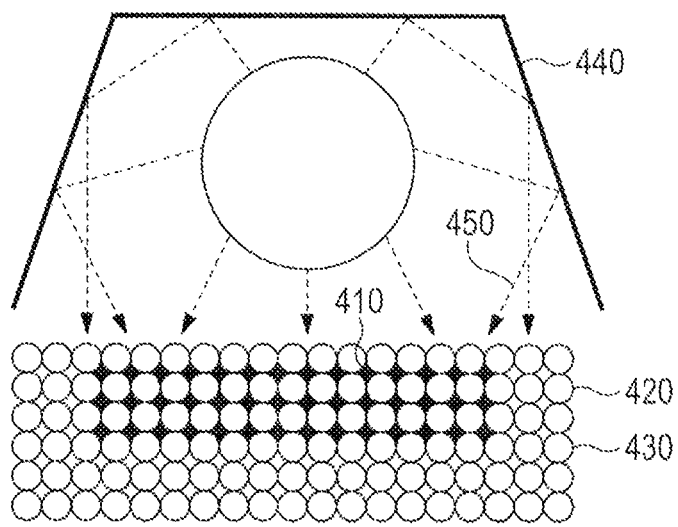
Figure 4C:
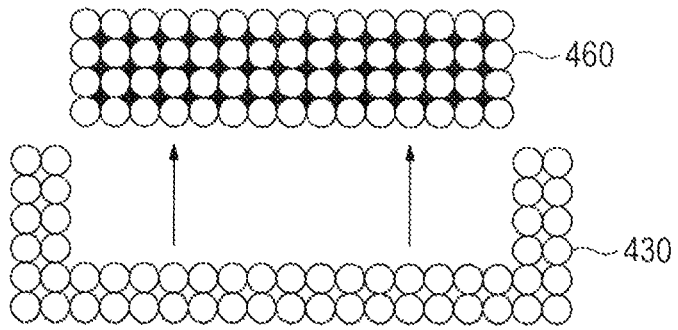

FIGS. 4A-4C show that binder fluid 410 is applied to a bed of build material 430 by layering the binder fluid 410 with metallic build material layer 420 (FIG. 4A). Then a photonic energy emitter 440 is used to discharge an energy flux 450 onto the bed of build material 430 after patterning is complete or after each layer of binder fluid 410 is applied to the metallic build material layer 420 flash fusing to bind polymer particles in the binder fluid 410 with the metallic build material 420 thereby forming a three-dimensional object (FIG. 4B). Then the three-dimensional object 460 is removed from the bed of build material 430 (FIG. 4C).

Figure 5A:
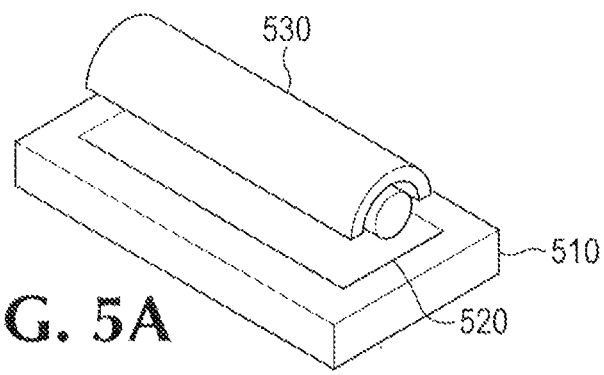
FIGS. 5A through 5C are simplified schematic views of an example 3D printing system showing irradiation by an example of the 3D printing method disclosed herein.
Figure 5B:
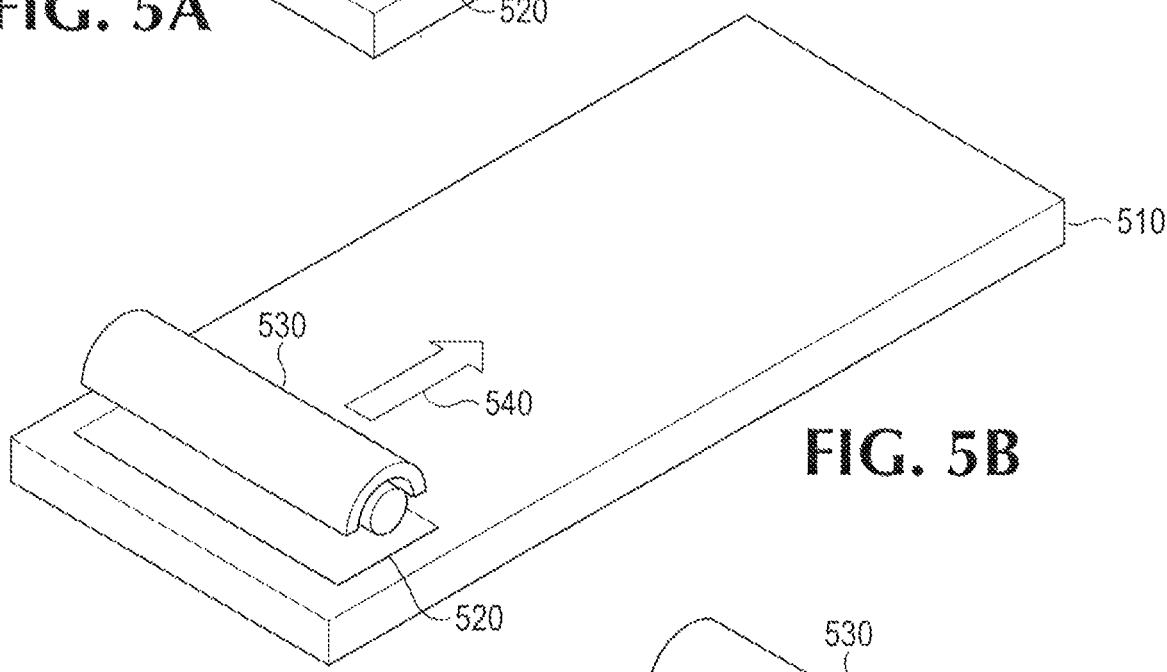
Figure 5C:
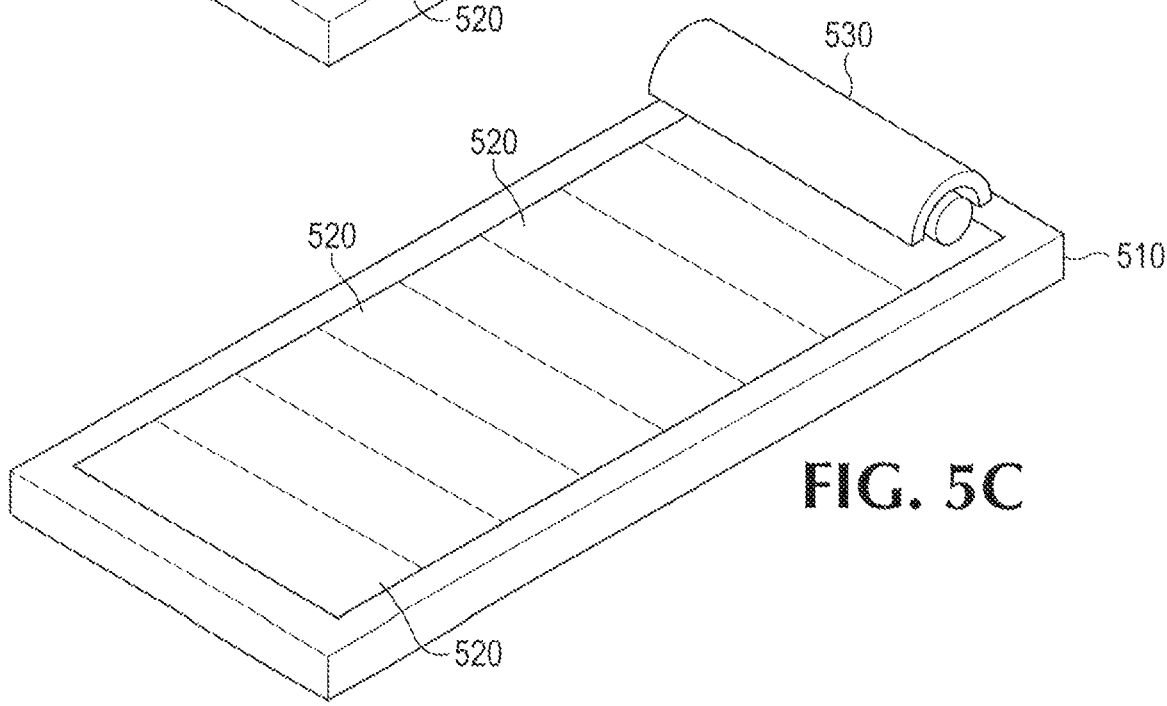

In FIGS. 5A-5C, shows a schematic view of a photonic energy emitter 530 forming an irradiated the top layer 520 of a metallic build material bed 510 (FIG. 5A). FIG. 5B shows the photonic energy emitter 530 moving in the direction of arrow 540 to irradiate the top layer of the build material bed 510 (FIG. 5B) such that substantially most of the top layer of the build material bed 510 is irradiated 520 (FIG. 5C).

Figure 9:
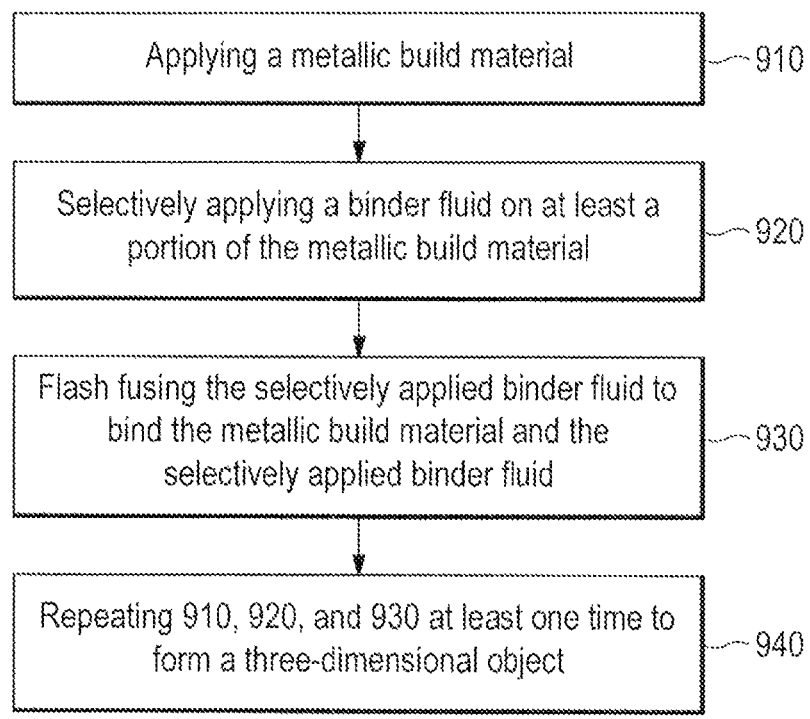
FIG. 9 is a flow diagram illustrating an example of a 3D printing method disclosed herein.

In FIG. 9, a flow diagram shows a method for printing a three-dimensional object 900 comprising:

(i) applying a metallic build material 910:
(ii) selectively applying a binder fluid on at least a portion of the metallic build material, wherein the binder fluid comprises a liquid vehicle and polymer particles dispersed in the liquid vehicle 920;
(iii) flash fusing the selectively applied binder fluid to bind the metallic build material and the selectively applied binder fluid by applying an energy flux having an energy density of from about 0.5 J/cm$^2$ to about 20 J/cm$^2$ for less than about 1 second 930; and
(iv) repeating (i), (ii), and (iii) at least one time to form the three-dimensional object 940.

Unless otherwise stated, any feature described hereinabove can be combined with any example or any other feature described herein.

In describing and claiming the examples disclosed herein, the singular forms "a," "an," and "the" include plural referents unless the context clearly dictates otherwise.

It is to be understood that concentrations, amounts, and other numerical data may be expressed or presented herein in range formats. It is to be understood that such range formats are used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, so forth. This same applies to ranges reciting a single numerical value.

Reference throughout the specification to "one example," "some examples," "another example," "an example," and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Unless otherwise stated, references herein to "wt %" of a component are to the weight of that component as a percentage of the whole composition comprising that component. For example, references herein to "wt %" of, for example, a solid material such as polyurethane(s) or colorant(s) dispersed in a liquid composition are to the weight percentage of those solids in the composition, and not to the amount of that solid as a percentage of the total non-volatile solids of the composition.

If a standard test is mentioned herein, unless otherwise stated, the version of the test to be referred to is the most recent at the time of filing this patent application.

All amounts disclosed herein and in the examples below are in wt % unless indicated otherwise.

To further illustrate the present disclosure, examples are given herein. It is to be understood that these examples are presented for illustrative reasons and are not to be construed as limiting the scope of the present disclosure.

EXAMPLES

Composition Example 1

An example 3D metallic part (referred to as "example part 1") was printed. The binder fluid used to print example part 1 contained an acrylic binder latex dispersion as the polymer particles, 2-methyl-1,3-propanediol and 2-pyrrolidinone as coalescing solvents. The general formulation of the binder fluid used to print example part 1 is shown in Table 1, with the wt % of each component that was used. The weight percentage of the acrylic binder latex dispersion represents the % actives, i.e., the total acrylic binder latex solids present in the final formulation.

TABLE 1

| Ingredient | Specific component | Example binder fluid (wt %) |
|---|---|---|
| Coalescing solvents | 2-methyl-1,3-propanediol | 9.00 |
|  | 2-pyrrolidinone | 16.00 |

TABLE 1-continued

| Ingredient | Specific component | Example binder fluid (wt %) |
|---|---|---|
| Surfactants | TERGITOL ™ 15-S-7 | 1.00 |
| | CAPSTONE ® FS-35 (25 wt % solution) | 1.98 |
| Polymer particles | Acrylic binder latex dispersion (solids - 31.3 wt %) | 38.65 |
| Water | | Balance |

The metallic build material used to print example parts was a spherical stainless steel (316L) powder with a D50 (i.e., the median of the particle size distribution, where % the population is above this value and % is below this value) of 42 µm. The binder fluid described in Table 1 above was used to print example parts in the below examples.

Example parts were printed by applying layers of the stainless steel powder and the binder fluid to form patterned three-dimensional objects. The thickness of each layer was from about 50 µm to about 200 µm. Binder fluid was selectively deposited in the form of a strip on the stainless steel powder layer with a thermal inkjet printer generating 10 picoliter binder fluid droplets. In order to characterize the amount of binder fluid used to achieve an effective binding of the metal particles, either 2 or 6 passes (hereafter called 2X and 6X, respectively) of the printer was used to deposit the targeted amount of binder fluid. In each pass, about 10 microliter of binder fluid was deposited in the form of the strip.

After air drying of the binder fluid deposited on stainless steel powder, the binder fluid selectively deposited on the stainless steel powder was exposed to a pulse irradiation—i.e., flash fusing—using a commercial Xe strobe lamp. In each case, a single 15 millisecond pulse was used. Energy delivered to the powder's surface was adjusted by changing the lamp discharge voltage.

After flash fusing, as a demonstration of the polymer particles in the binder fluid melting, metal particles within the region where acrylic binder latex polymer particles were present was lifted as a "solid" three-dimensional piece of a strip. In contrast, outside of this region (where no polymer particles were present because no binder fluid had been deposited), the stainless steel powder remained loose, as shown in FIGS. 6, 7, and 8 discussed below.

Three-Dimensional Printed Object—Example 1

Figure 6C:
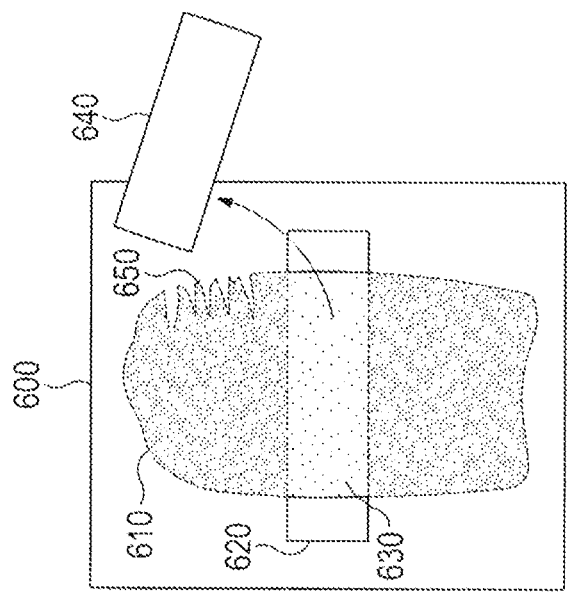
FIGS. 6A through 6C are schematic depictions of three-dimensional objects formed by examples of a 3D printing method disclosed herein.
Figure 6B:
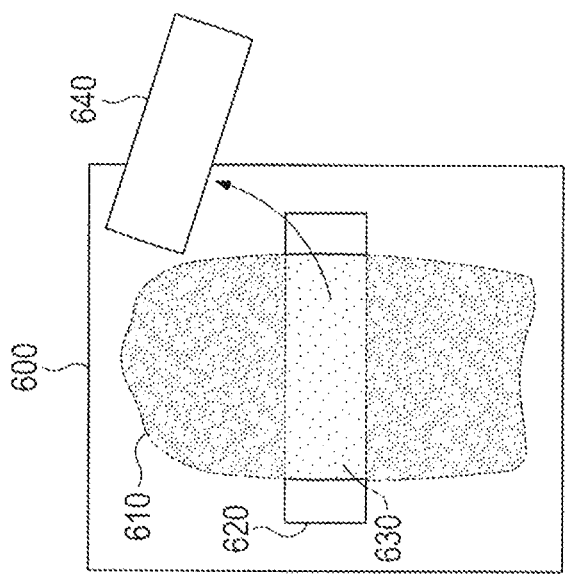
Figure 6A:
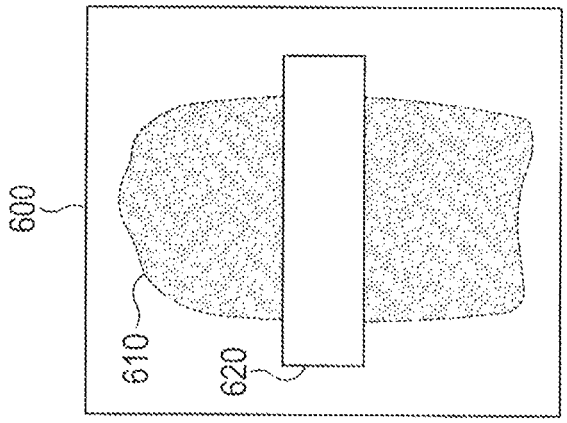

FIGS. 6A through 6C are schematic depictions of a three-dimensional object formed by the method using the composition described in Composition Example 1 above.

FIG. 6A shows stainless steel powder 610 before flash fusing. One 200 µm thick layer of stainless steel powder 610 was spread on a quartz substrate 600. Then a strip 620 of the binder fluid was deposited over the stainless steel powder 610. 6 passes of binder fluid were deposited. In each pass, about 10 microliter of binder fluid was deposited in the form of the strip 620.

FIG. 6B shows what happened to the materials deposited in FIG. 6A after 9.74 J/cm² of an energy flux was applied to the entire powder 610 and strip region 620. The energy flux flash fused the about top 60% of the stainless steel powder region where the binder fluid was deposited 620. After flash fusing, the about top 60% of this strip region 620 became solidified and this solidified strip was lifted off as a solid piece 640 leaving behind loose stainless steel powder 630 that did not bind due to a lack of sufficient binder fluid in the bottom region of the stainless steel powder 610.

FIG. 6C shows all the same elements and the same three-dimensional object as FIG. 6B and further shows that stainless steel powder 610 that did not receive any binder fluid 620 deposited in a strip form was easily scratched off 650 because no binder fluid was present in this region even though the entire powder 610 and strip region 620 was exposed to the energy flux.

Three-Dimensional Printed Object—Example 2

Figures 7A, 7B:
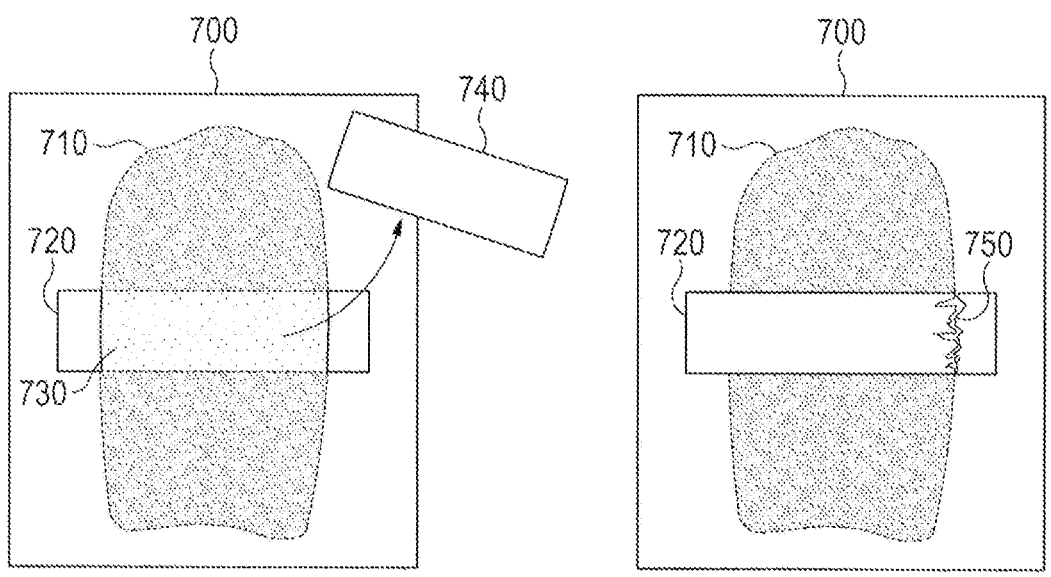
FIGS. 7A and 7B are schematic depictions of three-dimensional objects formed by an example of a 3D printing method disclosed herein (FIG. 7A) compared with a comparative 3D printing method (FIG. 7B)
Figure 8:
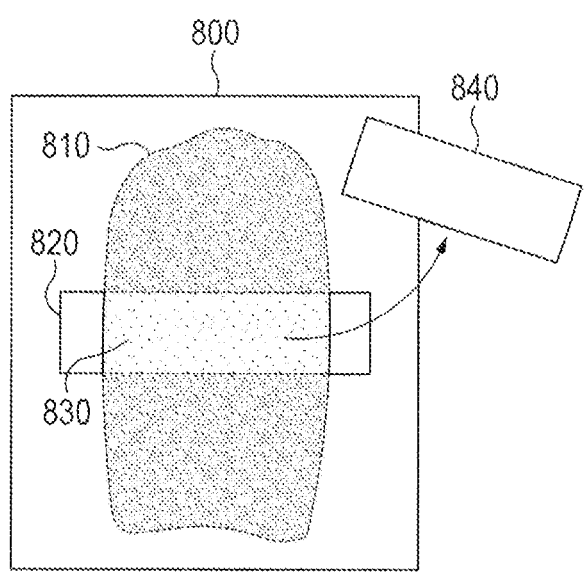
FIG. 8 is a schematic depiction of a three-dimensional object formed by an example of a 3D printing method disclosed herein.

FIGS. 7A and 7B are schematic depictions of three-dimensional objects formed by the method using the composition described in Composition Example 1 above.

FIG. 7A shows stainless steel powder 710 deposited in one 200 µm thick layer on a quartz substrate 700. Then a strip 720 of binder fluid was deposited over the stainless steel powder 710 in 6 passes—i.e., 6X. In each pass, about 10 microliter of binder fluid was deposited in the form of the strip 720. The entire stainless steel powder 710 and binder fluid strip 720 were irradiated with 7.47 J/cm² causing formation of a solid three-dimensional strip. This solidified strip 740 was lifted off leaving behind some loose stainless steel powder 730.

FIG. 7B shows all the same elements and the same three-dimensional object as FIG. 7A and further shows stainless steel powder 710 deposited in one 200 µm thick layer on a quartz substrate 700. Then a strip 720 of binder fluid was deposited over the stainless steel powder 710 in 2 passes—i.e., 2X. In each pass, about 10 microliter of binder fluid was deposited in the form of the strip 720. The entire stainless steel powder 710 and binder fluid strip 720 were irradiated with a higher energy flux of 12.98 J/cm². The strip 720 did not solidify to allow lifting off a piece of a strip. Instead, the strip 720 was easily scratched off 750.

Figure 10:
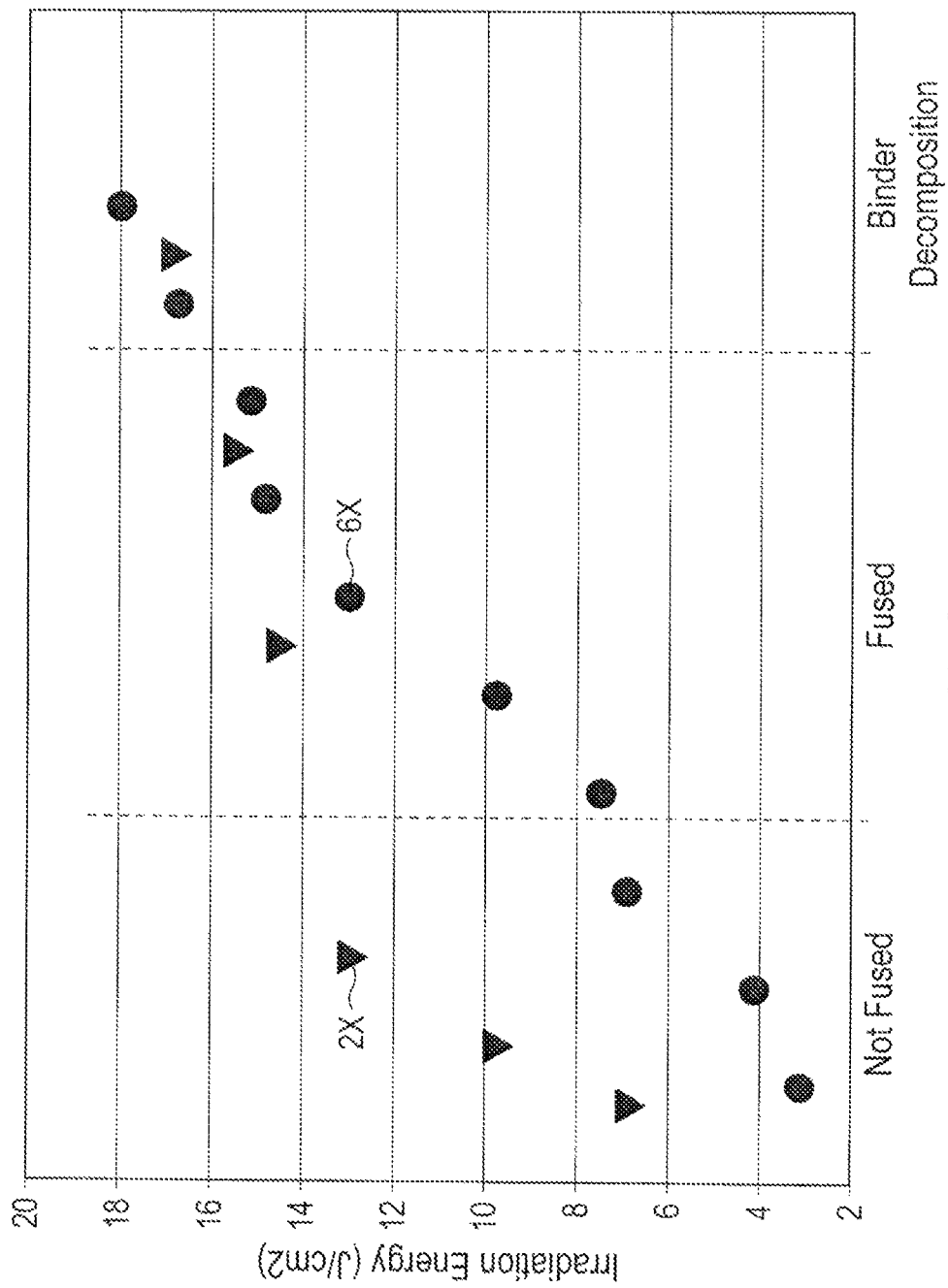
FIG. 10 is a graph showing a correlation between binder load and energy density used to fuse polymer particles and metal particles to form a three-dimensional object.

FIG. 10 is a graph showing a correlation between binder load and energy density used to fuse polymer particles and metal particles to form a three-dimensional object comparing FIGS. 7A and 7B. This graph shows that when 2 passes of binder fluid were deposited, higher energy flux was used to achieve fusing to bind the metal particles and the polymer particles. When 6 passes of binder fluid were deposited, lower energy flux was used to achieve fusing to bind the metal particles and the polymer particles.

It was found that photonic energy of about 3.12 J/cm² was used to initiate melting of the latex polymer particles and that photonic energy above about 21.1 J/cm² caused rapid boiling and decomposition of the binder.

Three-Dimensional Printed Object—Example 3

FIG. 8 is a schematic depiction of a three-dimensional object formed by the method using the composition described in Composition Example 1 above.

FIG. 8 shows three layers of stainless steel powder 810 each having a thickness of about 50 µm spread on a quartz substrate 800. Then a strip 820 of the binder fluid was deposited over the stainless steel powder 810 in 6 passes—6X thereby depositing two layers of binder fluid on top of each layer of stainless steel powder 810. In each pass, about 10 microliter of binder fluid was deposited in the form of the strip 820.

An energy flux of 9.74 J/cm² was applied to the entire powder 810 and strip region 820. The energy flux flash fused substantially all the stainless steel powder region where the binder fluid was deposited 820. After flash fusing, this strip region 820 became solidified and the entire solidified strip was lifted off as a solid piece 840 leaving behind some loose stainless steel powder 830.

The above examples show that when sufficient polymer particles are present in binder fluid deposited over metallic build material powder and sufficient energy flux is applied using a photonic energy emitter a strong three-dimensional object can be prepared.

The above examples also show that rapid melting of the polymer particles by application of the energy flux during flash fusing promotes melting of polymer particles in binder fluid to high temperatures (i.e., up to several hundreds of degrees Celsius) in less than about 1 second without causing thermal decomposition of the polymer.

The above examples also show that flash fusing can promote layer-by-layer fusing the polymer particles to bind the melted polymer particles with the metallic powder. This can reduce the amount of time used for producing the three-dimensional object without the necessity for a separate curing process all the way at the end of the formation of the patterned three-dimensional object.

Because strong three-dimensional objects can be prepared by layer-by-layer flash fusing, this method of forming the three-dimensional object is more economical because of not only is no thermal energy used during the formation of the three-dimensional object, electrical energy usage can be calculated to show about 3 orders of magnitude reduced difference between the customary quartz-tungsten-halogen heating lamp versus the photonic energy emitter for flash fusing (e.g., Xe lamp flash fusing). This reduction in energy to form the three-dimensional object can result from at least one of an increased efficiency energy flux generation, improved match between metallic powder absorption and lamp emission spectra, and elimination of the necessity to heat the entire build material bed.

While several examples have been described in detail, it is to be understood that the disclosed examples may be modified. Therefore, the foregoing description is to be considered non-limiting.

What is claimed is:

1. A method for printing a three-dimensional object comprising:
   (i) applying a metallic build material;
   (ii) selectively applying a binder fluid on at least a portion of the metallic build material, wherein the binder fluid comprises a liquid vehicle and latex polymer particles dispersed in the liquid vehicle, wherein the liquid vehicle includes a coalescing solvent selected from the group consisting of 2-pyrrolidinone, 1-(2-hydroxyethyl)-2-pyrrolidone, tripropylene glycol mono methyl ether, dipropylene glycol mono methyl ether, dipropylene glycol mono propyl ether, tripropylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, ethylene glycol mono n-butyl ether acetate, 2-methyl-1,3-propanediol, and a combination thereof, and wherein the latex polymer particles have a molecular weight ranging from about 100,000 Mw to about 500,000 Mw and are heteropolymers each having from greater than 0 wt % to about 40 wt % of a hydrophobic component and a balance of a hydrophilic component, wherein the hydrophobic component is selected from the group consisting of styrene, p-methyl styrene, α-methyl styrene, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, derivatives thereof, and combinations thereof;
   (iii) flash fusing the selectively applied binder fluid to bind the metallic build material and the selectively applied binder fluid by applying an energy flux having an energy density of from about 0.5 J/cm$^2$ to about 20 J/cm$^2$ for less than about 1 second;
   (iv) repeating (i), (ii), and (iii) at least one time to form the three-dimensional object;
   (v) exposing the three-dimensional object to a de-binding temperature; and
   (vi) exposing the three-dimensional object to a sintering temperature that is higher than the de-binding temperature.

2. The method of claim 1, wherein:
   the latex polymer particles have a glass transition temperature of from about 25° C. to about 125° C.; and
   the latex polymer particles have a thermal decomposition temperature of from about 250° C. to about 600° C.

3. The method of claim 1, wherein the flash fusing temperature is from about 125° C. to about 400° C.

4. The method of claim 1, wherein the flash fusing occurs using a photonic energy emitter which applies non-coherent photonic energy as at least one pulse to the metallic build material and the selectively applied binder fluid.

5. The method of claim 1, wherein the flash fusing irradiates the metallic build material and the binder fluid.

6. The method of claim 1, wherein:
   the flash fusing occurs using a gas discharge photonic energy emitter; and
   the gas employed in the gas discharge photonic energy emitter is selected from the group consisting of xenon, krypton, argon, helium, neon, and combinations thereof.

7. The method of claim 1, wherein the latex polymer particles are present in the binder fluid in an amount ranging from about 2 wt % to about 30 wt % based on the total weight of the binder fluid.

8. The method of claim 1, wherein:
   the de-binding temperature is a thermal decomposition temperature of the latex polymer particles and ranges from about 250° C. to about 600° C.; and
   the sintering temperature ranges from about 850° C. to about 2500° C.

9. The method of claim 1, wherein:
   the three-dimensional object is exposed to the de-binding temperature for a thermal decomposition time period ranging from about 10 minutes to about 72 hours; and
   the three-dimensional object is exposed to the sintering temperature for a sintering time period ranging from about 20 minutes to about 15 hours.

10. The method of claim 1, wherein the binder fluid consists of the latex polymer particles and the coalescing solvent.

11. The method of claim 1, wherein the coalescing solvent is selected from the group consisting of 2-pyrrolidinone, 2-methyl-1,3-propanediol, and a combination thereof.

12. The method of claim 1, wherein the flash fusing includes applying multiple passes of the energy flux having an energy density of from about 3.12 J/cm$^2$ to less than about 10 J/cm$^2$ for a total application of less than about 1 second.

13. The method of claim 1, wherein the flash fusing includes applying photonic energy to the metallic build material and the selectively applied binder fluid, and wherein the coalescing solvent plasticizes the latex polymer particles upon exposure to the applied photonic energy to temporarily bind the metallic build material.

14. The method of claim 1, wherein the coalescing solvent is selected from the group consisting of 2-pyrrolidinone, 1-(2-hydroxyethyl)-2-pyrrolidone, tripropylene glycol mono methyl ether, dipropylene glycol mono methyl ether, dipropylene glycol mono propyl ether, tripropylene glycol mono n-butyl ether, propylene glycol phenyl ether, diethylene glycol mono butyl ether, diethylene glycol mono hexyl ether, ethylene glycol phenyl ether, 2-methyl-1,3-propanediol, and a combination thereof.

\* \* \* \* \*